(12) United States Patent
Shanley

(10) Patent No.: US 7,973,996 B2
(45) Date of Patent: Jul. 5, 2011

(54) OPTICAL SYSTEM FOR A DIGITAL LIGHT PROJECTION SYSTEM INCLUDING A 3-CHANNEL LED ARRAY LIGHT ENGINE

(75) Inventor: James F. Shanley, Westborough, MA (US)

(73) Assignee: Scram Technologies, Inc., Annapolis, MD (US)

( * ) Notice: Subject to any disclaimer, the term of this patent is extended or adjusted under 35 U.S.C. 154(b) by 0 days.

(21) Appl. No.: 12/583,548

(22) Filed: Aug. 20, 2009

(65) Prior Publication Data
US 2009/0323028 A1    Dec. 31, 2009

Related U.S. Application Data

(63) Continuation-in-part of application No. 11/299,281, filed on Dec. 9, 2005, now abandoned.

(51) Int. Cl.
*G02B 26/00* (2006.01)
(52) U.S. Cl. ........................ 359/269; 359/645
(58) Field of Classification Search .................. 359/296
See application file for complete search history.

(56) References Cited

U.S. PATENT DOCUMENTS

| | | | |
|---|---|---|---|
| 2,215,900 A | 9/1940 | Bitner | |
| 2,254,961 A | 9/1941 | Harris | |
| 5,604,607 A * | 2/1997 | Mirzaoff | 358/484 |
| 5,700,076 A | 12/1997 | Minich et al. | |
| 5,757,557 A | 5/1998 | Medvedev et al. | |
| 6,227,682 B1 | 5/2001 | Li | |
| 6,547,423 B2 | 4/2003 | Marshall et al. | |
| 6,580,469 B1 | 6/2003 | Rieche et al. | |
| 6,595,673 B1 | 7/2003 | Ferrante et al. | |
| 6,619,820 B2 | 9/2003 | Li | |
| 6,724,543 B1 | 4/2004 | Chinniah et al. | |
| 6,739,726 B2 | 5/2004 | Li | |
| 6,819,505 B1 | 11/2004 | Cassarly et al. | |
| 6,819,506 B1 | 11/2004 | Taylor et al. | |
| 6,836,576 B2 | 12/2004 | Li | |
| 6,856,436 B2 | 2/2005 | Brukilacchio et al. | |
| 6,856,727 B2 | 2/2005 | Li | |
| 6,857,772 B2 | 2/2005 | Brukilacchio | |

(Continued)

OTHER PUBLICATIONS

Automated optimization advances software for illumination design. Laser Focus World, Nov. 2004. Author: William Cassarly, 3 pages.

*Primary Examiner* — Scott J Sugarman
*Assistant Examiner* — James C Jones
(74) *Attorney, Agent, or Firm* — Matthew J. Esserman

(57) ABSTRACT

An optical system for a digital light projection system is provided. The optical system comprises a plurality of LED arrays, wherein each LED array comprises a plurality of LEDs. The optical system also comprises an optical concentrator element positioned substantially adjacent to each of the LED arrays, wherein each concentrator element totally internally reflects light emitted from the plurality of LEDs within the corresponding LED array so as to provide substantially uniform light at an output surface of each concentrator element, and wherein the concentrator element has a complex conic shape. The optical system preferably further comprises an optical combiner element, wherein the output surface of each concentrator element is positioned substantially adjacent to a corresponding side of the combiner element, and wherein the combiner element spatially combines the substantially uniform light provided at the output surface of each concentrator element so as to form substantially white light at an output surface of the combiner element.

27 Claims, 12 Drawing Sheets

U.S. PATENT DOCUMENTS

| | | |
|---|---|---|
| 6,871,982 B2 | 3/2005 | Holman et al. |
| 6,926,435 B2 | 8/2005 | Li |
| 6,942,365 B2 | 9/2005 | Galli |
| 6,969,177 B2 | 11/2005 | Li et al. |
| 6,974,234 B2 | 12/2005 | Galli |
| 7,002,745 B2 | 2/2006 | Li |
| 7,006,288 B2 | 2/2006 | Li |
| 7,020,368 B2 | 3/2006 | Li |
| 7,072,096 B2 | 7/2006 | Holman et al. |
| 7,106,936 B2 | 9/2006 | Saccomanno |
| 7,151,874 B2 | 12/2006 | Li |
| 7,153,015 B2 | 12/2006 | Brukilacchio |
| 7,172,290 B2 | 2/2007 | Li |
| 2002/0176175 A1 | 11/2002 | Kamo |
| 2005/0201100 A1 | 9/2005 | Cassarly et al. |
| 2006/0002101 A1 | 1/2006 | Wheatley et al. |
| 2006/0044523 A1 | 3/2006 | Teijido et al. |
| 2006/0126178 A1 | 6/2006 | Li |
| 2006/0139580 A1 | 6/2006 | Conner |
| 2006/0164600 A1 | 7/2006 | Morejon et al. |
| 2006/0164857 A1 | 7/2006 | Morejon et al. |

* cited by examiner

| ITEM NO. | QTY. | PART NO. |
|---|---|---|
| 1 | 1 | OSA Armature 2-25-05 |
| 2 | 1 | Projection Housing 2-25-05 |
| 9 | 1 | Lens 6-8300-01-006 |
| 22 | 1 | DMD PC Board 2-09-05 |
| 32 | 1 | Lens Strap 1 |
| 33 | 1 | Lens Strap 2 |
| 52 | 1 | Turning Mirror 2 3-09-05 |
| 53 | 1 | Turning Mirror 1 |
| 55 | 1 | TIR Prism Cover-top |
| 57 | 1 | TIR Prism Cover-front |
| 58 | 1 | Beam Dump |
| 66 | 1 | Illuminator Housing 3-8-05 |
| 71 | 1 | LED Housing |
| 87 | 3 | LED Heat Sink |

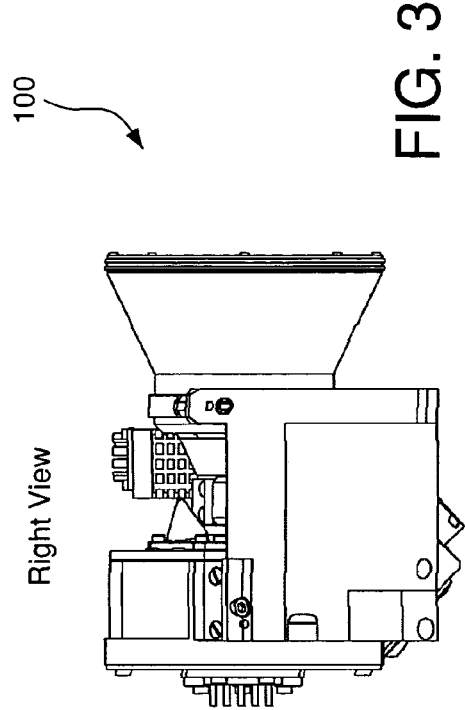
FIG. 3
Right View
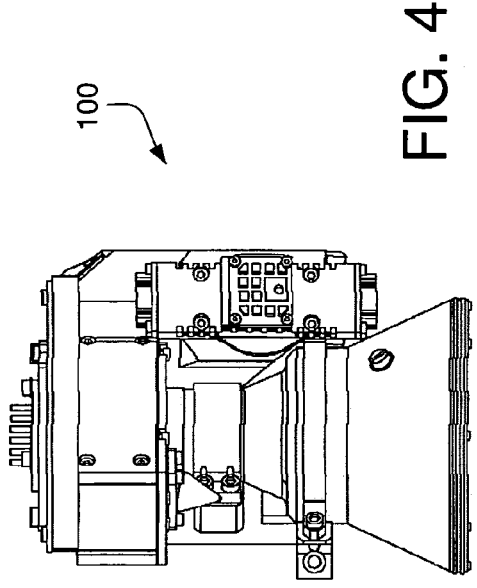
FIG. 4
Plan View
FIG. 2
Left View

| ITEM NO. | QTY. | PART NO. |
|---|---|---|
| 1 | 2 | M2 PIN |
| 2 | 1 | alignment disk |
| 3 | 1 | 1pc housing |
| 4 | 4 | Prism 1, 8300-01-301 |
| 5 | 3 | aperture |
| 8 | 1 | prism retainer |
| 11 | 1 | Prism oring |
| 13 | 3 | S_1064 spring |
| 14 | 3 | OCE bd-3n |
| 15 | 96 | LL-CREE XB290 Die |
| 16 | 3 | OCE for X-cube 1_finished |
| 17 | 3 | small heat spreader |
| 18 | 3 | OCE lock |
| 19 | 3 | Custom heat sink |
| 20 | 3 | OCE Holder2 |

OPTICAL SYSTEM FOR A DIGITAL LIGHT PROJECTION SYSTEM INCLUDING A 3-CHANNEL LED ARRAY LIGHT ENGINE

This application is a continuation-in-part of U.S. patent application Ser. No. 11/299,281, filed Dec. 9, 2005 now abandoned.

FIELD OF THE INVENTION

The present invention relates generally to the field of digital light projection systems, and, more specifically, to optical systems for digital light projection systems including a 3-channel LED array light engine.

BACKGROUND OF THE INVENTION

For digital light projection (DLP) systems, a need exists for an optical system capable of producing a substantially uniform and substantially white light in the illumination path. Traditional optical systems for DLP systems typically include light sources such as, for example, high intensity mercury lamps or xenon lamps. However, these traditional optical systems and corresponding light sources suffer from drawbacks such as, for example, non-uniformity of light, non-white light, and insufficient brightness. Moreover, the excess heat generation and high design complexity of these traditional optical systems require complicated and expensive procedures and techniques to manufacture the optical systems.

Thus, it is desirable to provide an optical system which is able to overcome the above disadvantages and which can be manufactured in an inexpensive and efficient fashion.

It is therefore desirable to provide an optical system including LED arrays and corresponding optical concentrator elements that can be utilized in DLP systems, and that does not suffer from the above drawbacks experienced by traditional optical systems. Additionally, while addressing these problems, the optical system including LED arrays and corresponding optical concentrator elements of the present invention will simultaneously provide superior uniformity of light, white light, and brightness desired in DLP systems.

These and other advantages of the present invention will become more fully apparent from the detailed description of the invention hereinbelow.

SUMMARY OF THE INVENTION

The present invention is directed to an optical system for a digital light projection system, the optical system comprising a plurality of LED arrays, wherein each LED array comprises a plurality of LEDs. The optical system also comprises an optical concentrator element positioned substantially adjacent to each of the LED arrays, wherein each concentrator element totally internally reflects light emitted from the plurality of LEDs within the corresponding LED array so as to provide substantially uniform light at an output surface of each concentrator element. The optical system may further comprise an optical combiner element, wherein the output surface of each concentrator element is positioned substantially adjacent to a corresponding side of the combiner element, and wherein the combiner element spatially combines the substantially uniform light provided at the output surface of each concentrator element so as to form substantially white light at an output surface of the combiner element.

BRIEF DESCRIPTION OF THE DRAWINGS

For the present invention to be clearly understood and readily practiced, the present invention will be described in conjunction with the following figures, wherein:

FIG. 2 is a left side view of the digital light projection system shown in FIG. 1.

FIG. 3 is a right side view of the digital light projection system shown in FIG. 1.

FIG. 4 is a plan view of the digital light projection system shown in FIG. 1.

DETAILED DESCRIPTION OF THE PREFERRED EMBODIMENTS

Figure 1:
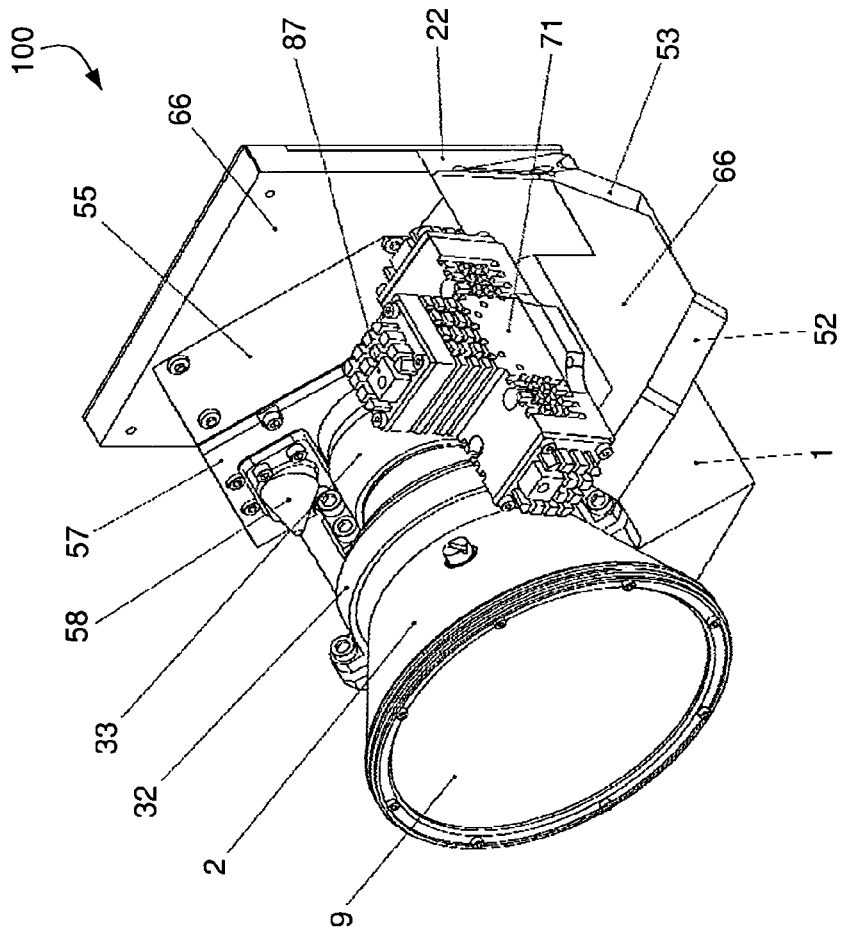
FIG. 1 is an isometric view illustrating a digital light projection system including a 3-channel LED array configuration, in accordance with a preferred embodiment of the present invention.

It is to be understood that the figures and descriptions of the present invention may have been simplified to illustrate elements that are relevant for a clear understanding of the present invention, while eliminating, for purposes of clarity, other elements found in a typical digital light projection system. Those of ordinary skill in the art will recognize that other elements may be desirable and/or required in order to implement the present invention. However, because such elements are well known in the art, and because they do not facilitate a better understanding of the present invention, a discussion of such elements is not provided herein. It is also to be understood that the drawings included herewith only provide diagrammatic representations of the presently preferred structures of the present invention and that structures falling within the scope of the present invention may include structures different than those shown in the drawings. Reference will now be made to the drawings wherein like structures are provided with like reference designations.

For purposes of this disclosure, the phrase "complex conic shape" is hereby defined as a shape having at least 1 side which is defined by at least 2 different equations.

Illustrated in FIG. 1 is a digital light projection (DLP) system 100 in accordance with an preferred exemplary embodiment of the present invention. The DLP system is an assembly and orientation of components including an armature 1, projection housing 2, lens 9, digital micromirror device (DMD) board 22, lens straps 32,33, turning (folding) mirrors 52,53, total internal reflection (TIR) prism top cover 55, TIR prism front cover 57, beam dump 58, illuminator housing 66, light emitting diode (LED) housing 71, and LED heat sink 87. Although a DMD is utilized in this configuration as the digital imaging device 75 (see FIGS. 10-12), alternative digital imaging devices may be contemplated.

Figure 5:
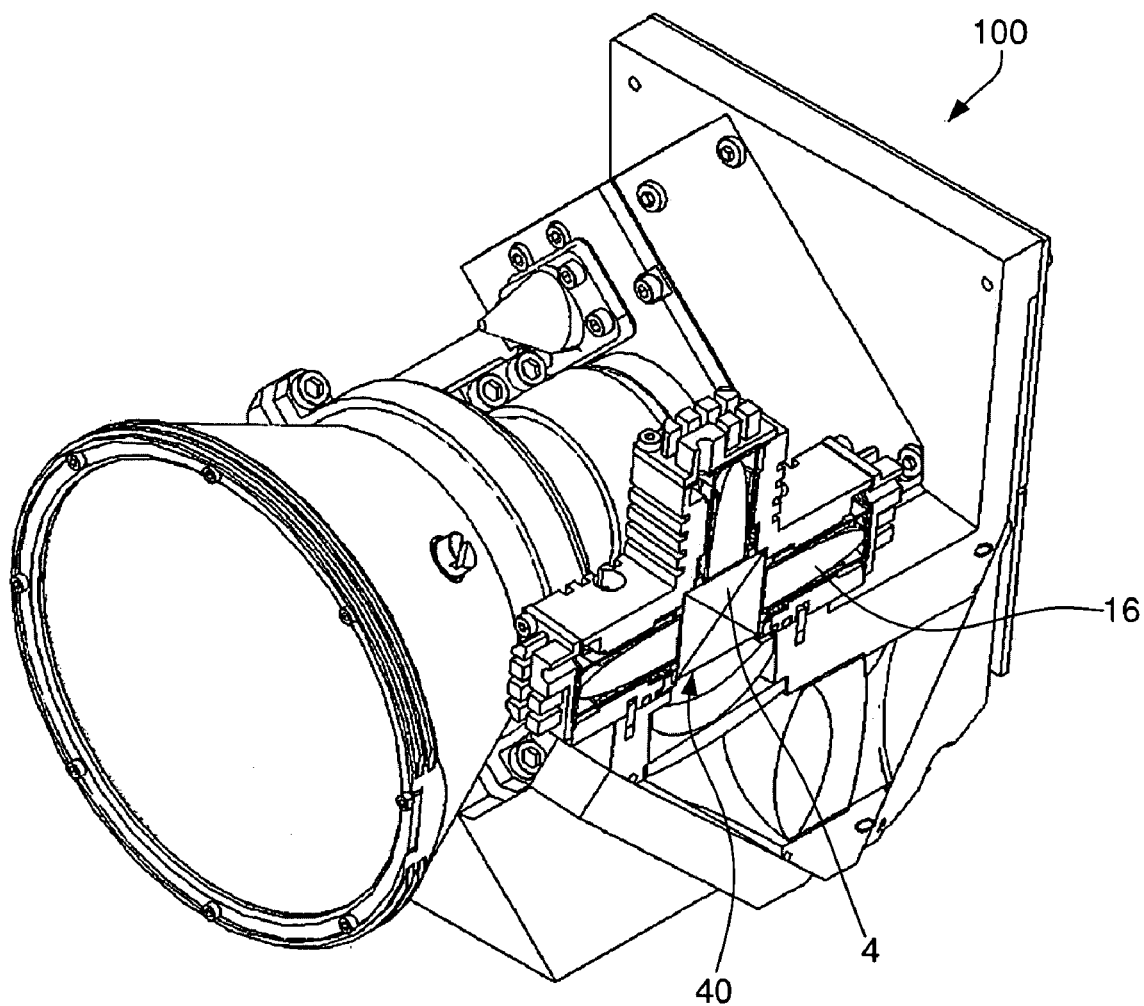
FIG. 5 is a cross-sectional view of the digital light projection system shown in FIG. 1.

FIG. 2 is a left side view of the DLP system 100 shown in FIG. 1. FIG. 3 is a right side view of the DLP system 100 shown in FIG. 1. FIG. 4 is a plan view of the DLP system 100 shown in FIG. 1. FIG. 5 is a cross-sectional view of the DLP system 100 shown in FIG. 1.

Figure 6:
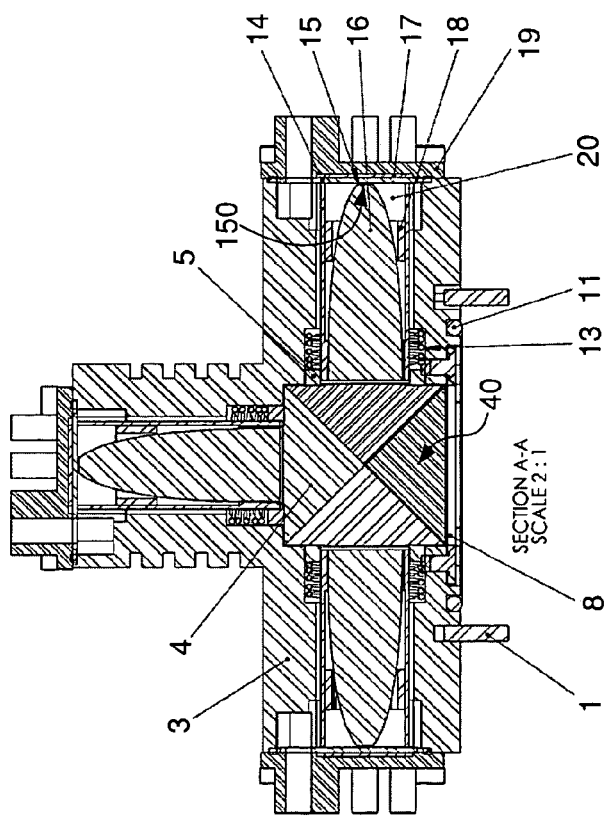
FIG. 6 is an enlarged, cross-sectional left side view of a portion of the digital light projection system shown in FIG. 1, including the 3 optical concentrator elements, the optical combiner element, and the 3 LED arrays.

FIG. 6 (with reference to the cross-sectional portion of FIG. 5) is an enlarged, cross-sectional left side view of a portion of the DLP system 100 shown in FIG. 1, including 3 optical concentrator elements 16, an optical combiner element 40, and 3 LED arrays 150. FIG. 6 also illustrates a pin 1, alignment disk 2, housing 3 (preferably aluminum which is cast or machined), prism 4, aperture 5, prism retainer 8, prism o-ring 11, spring 13, optical concentrator element board (or LED array mounting board) 14, LED (die) 15, small heat spreader 17, optical concentrator element lock 18, custom heat sink 19, and optical concentrator element holder 20. Although it is shown that, in this preferred example, one particular type of LED is utilized (i.e. LL-CREE XB290—for one of the 3 channels), other LEDs from other manufacturers may of course be contemplated. The number of LEDs per each LED array is preferably 32 but this number may vary. Also, the number of LEDs in one LED array may differ from that in another LED array.

Figure 7:
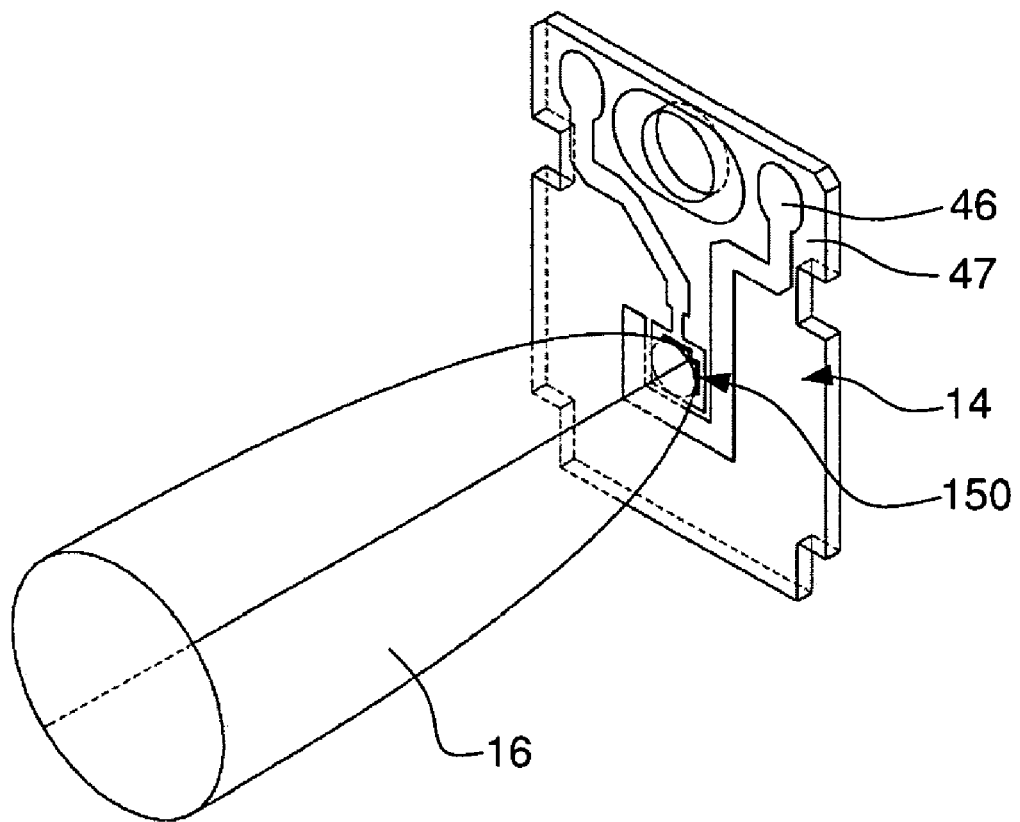
FIG. 7 is an enlarged, isometric view of a portion of the digital light projection system shown in FIG. 1, including the optical concentrator element, the LED array and corresponding LED array mounting board.

FIG. 7 is an enlarged, isometric view of a portion of the DLP system 100 shown in FIG. 1, including an optical concentrator element 16, an LED array 150 and corresponding LED array mounting board 14. FIG. 7 also illustrates a preferred LED circuit trace 46 comprising, for example, gold. The LED array mounting board 14 comprises an LED submount/board 47 comprising, for example, beryllium oxide. The LEDs 15 may be directly mounted on LED array mounting board 14 or via a supplemental board therebetween.

Figure 8:
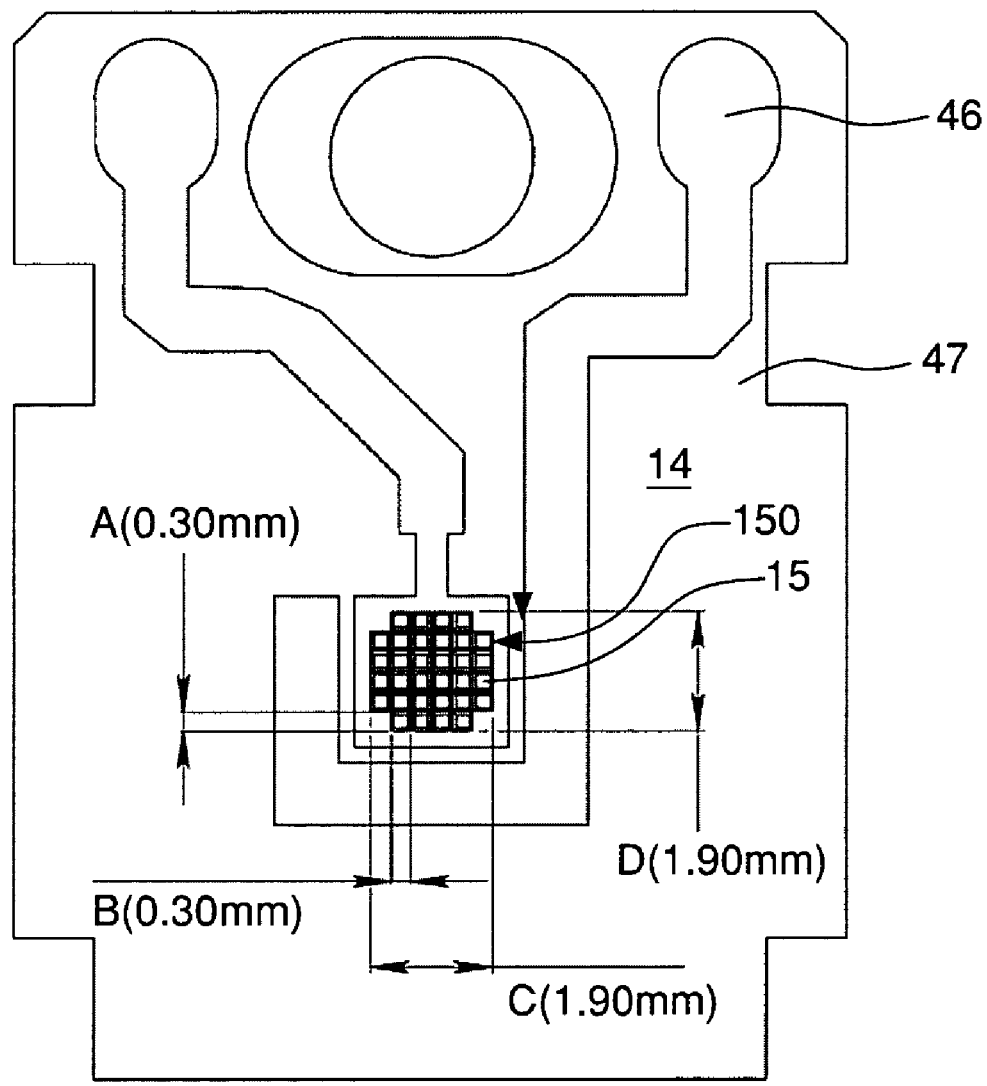
FIG. 8 is an enlarged, plan view of a portion of the digital light projection system shown in FIG. 1, including the LED array and corresponding LED array mounting board.
Figure 9:
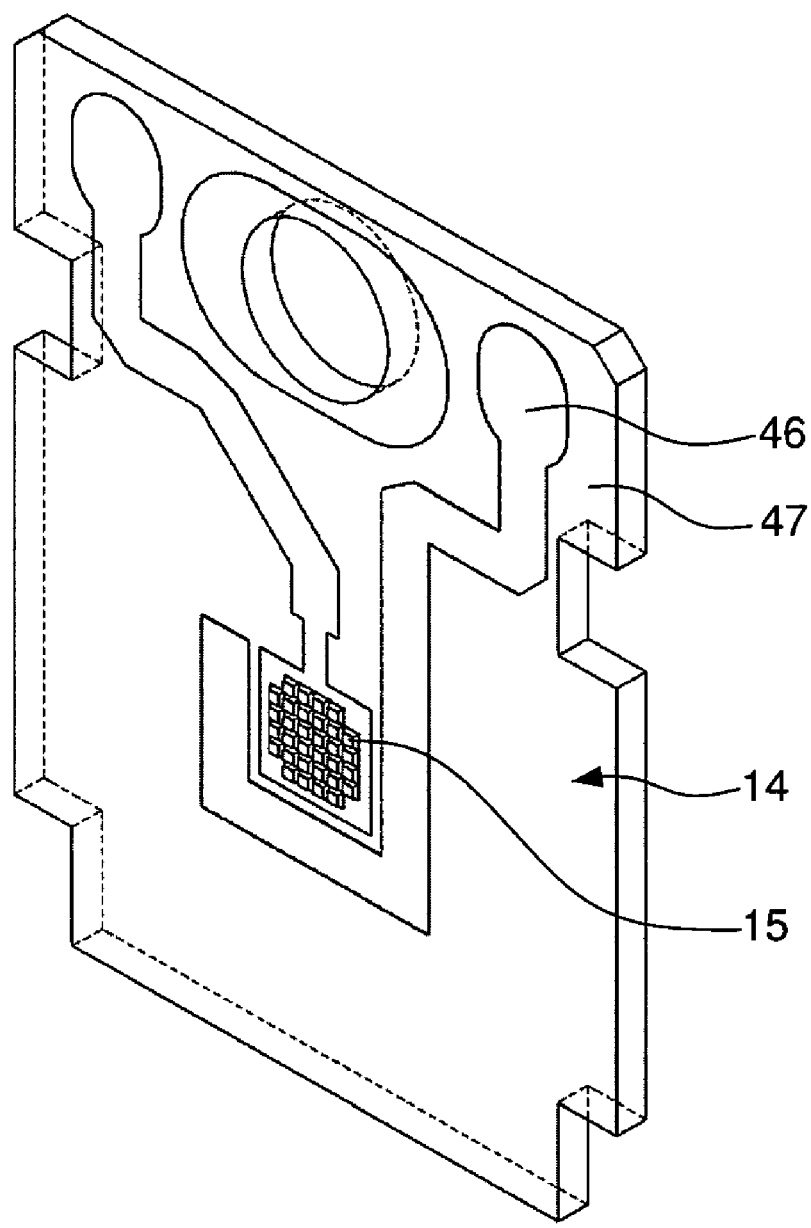
FIG. 9 is an isometric view of a portion of the digital light projection system shown in FIG. 1, including the LED array and corresponding LED array mounting board.

FIG. 8 is an enlarged, plan view of a portion of the DLP system 100 shown in FIG. 1, including an LED array 150 and corresponding LED array mounting board 14. The preferred dimensions and spacings of the LEDs 15 in the corresponding LED array 150 are as illustrated in FIG. 8 (i.e. A=0.30 mm, B=0.30 mm, C=1.90 mm, and D=1.90 mm). It is noted that other dimensions and spacings may be contemplated. FIG. 9 is an isometric view of a portion of the DLP system 100 shown in FIG. 1.

The optical concentrator element 16 is positioned substantially adjacent to each LED array 150, wherein each concentrator element 16 totally internally reflects light emitted from the plurality of LEDs 15 within the corresponding LED array 150 so as to provide substantially uniform light at an output surface of each concentrator element 16. The concentrator element 16 is formed by diamond-turning or mold processes. The concentrator element 16 preferably comprises a plastic, glass, or polymer material, or combinations thereof, that can withstand high heat such as, for example, Zeonex®. The concentrator element 16 is positioned directly in contact with each LED array. In the exemplary embodiment illustrated in the drawings, the concentrator element 16 is solid and TIR is employed therein. However, a reflective layer may be formed on portions (or the entire) outer surface of the concentrator element 16 to effect specular reflection instead of TIR. Alternative, the concentrator element 16 may be hollow and have reflective surfaces to achieve specular reflection. A concentrator element 16 having a combination of TIR and specular reflective portions may alternatively be contemplated.

The DLP system 100 may additionally include an optical coupling material positioned between the concentrator element and each LED array, wherein the optical coupling material is in contact with the concentrator element and each LED array. The optical coupling material preferably comprises a gel having an index of refraction which substantially matches that of the concentrator element.

Each LED array comprises LEDs which are preferably less than 0.35 mm in width, with 0.30 mm more preferably being the optimum width. Each LED array comprises LEDs which are spaced from adjacent LEDs within the same array by an amount preferably less than 0.025 mm, with 0.02 mm more preferably being the optimum spacing. Other widths and spacings outside these ranges may also be contemplated within the spirit and scope of this invention.

Figure 13:
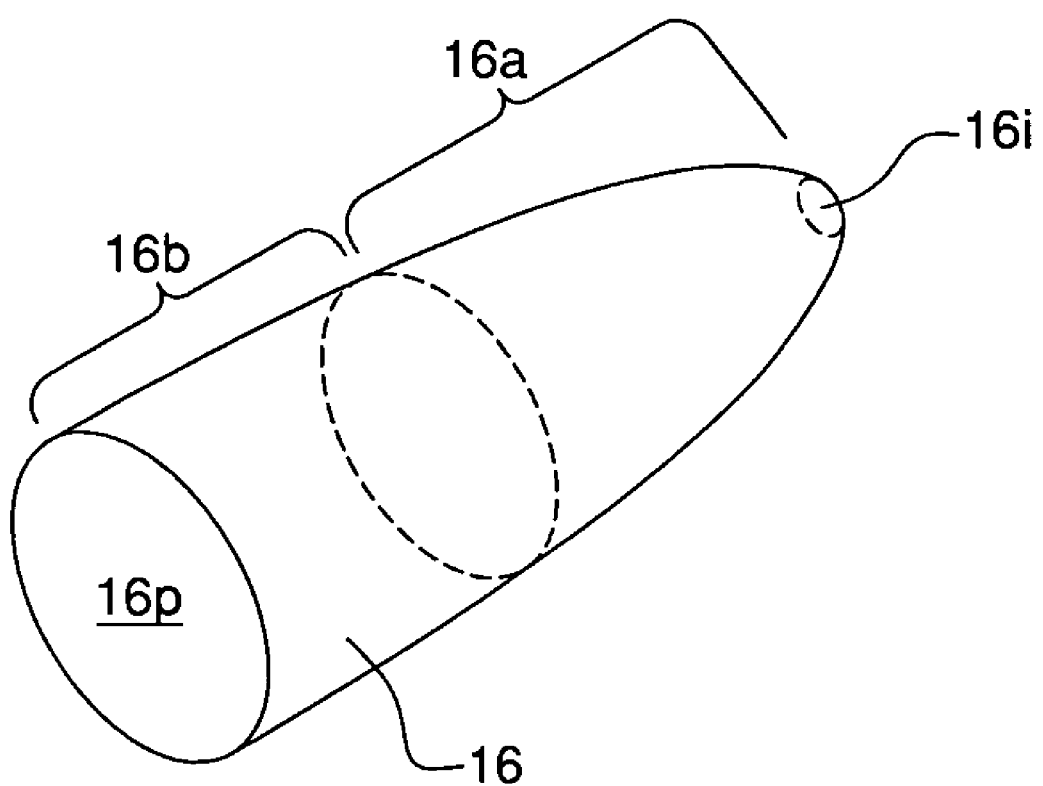
FIG. 13 is an enlarged, isometric view of the optical concentrator element shown in FIG. 7.

The concentrator element 16 has a complex conic shape along a direction longitudinally from the input surface 16$i$ to the output surface 16$p$. As such, at least one side of the concentrator element 16 includes side surface portions (surface profiles) 16$a$, 16$b$ (see FIG. 13). Side surface portion 16$a$ is defined by a first equation. Side surface portion 16$b$ is defined by a second equation which differs from the first equation. An equation could represent any suitable shape such as, for example, a straight line, parabola, etc. When light transmitted through the concentrator element 16 encounters the at least 2 side surface portions 16$a$,16$b$ having different surface profile shapes, the light appreciates a further and greater randomization, and therefore significant additional homogenization is realized as compared to a side surface defined by only one equation. This additional homogenization occurs since each surface profile shape 16$a$, 16$b$ randomizes the light reflections differently. As such, the use of a complex conic shape for the concentrator element enables a significantly greater homogenization of light. The transition/interface between the differing side surface portions may be immediate or may be gradual. The concentrator element 16 has a circular input surface 16$i$ and a circular output surface 16$p$.

The number of side surface portions 16$a$, 16$b$ having differing equations may be greater than 2. The size of each side surface portions 16$a$, 16$b$ having differing equations may independently vary and may not be equal with each other. The locations may also independently vary along a direction longitudinally from the input surface 16$i$ to the output surface 16$p$. The complex conic shape of the concentrator element 16 allows for one of the side surface portions 16$a$, 16$b$ to be flat. A greater number of side surface portions may be flat as long as there is at least one other side surface portion that is curved (i.e. "curved' being a different equation than "flat").

Other input/output surface shapes may also be envisioned within the spirit and scope of this invention. For example, the concentrator element 16 may have a circular (or oval) input surface 16$i$ and a rectangular (e.g. square) output surface 16$p$ or may alternatively have a rectangular (e.g. square) input surface and a circular (or oval) output surface.

Figure 14:
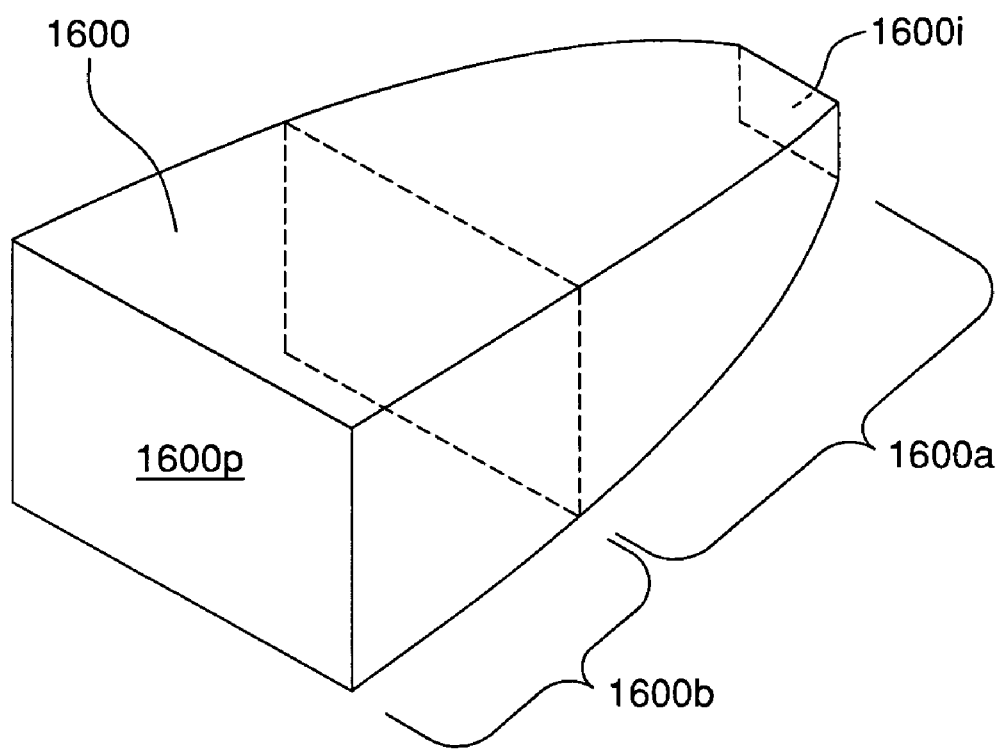
FIG. 14 is an enlarged, isometric view of another optical concentrator element having a rectangular input surface and a rectangular output surface, in accordance with a preferred embodiment of the present invention.

In another alternative embodiment, the concentrator element 1600 may alternatively have a rectangular input surface 1600*i* and a rectangular output surface 1600*p* as illustrated in FIG. 14. Similar to FIG. 13, the concentrator element 1600 in FIG. 14 has a complex conic shape along a direction longitudinally from the input surface 1600*i* to the output surface 1600*p* (and therefore enjoys similar light homogenization advantages) wherein at least one side of the concentrator element 1600 includes side surface portions (surface profiles) 1600*a*, 1600*b*. Side surface portion 1600*a* is defined by a first equation. Side surface portion 1600*b* is defined by a second equation which differs from the first equation. An equation could represent any suitable shape such as, for example, a straight line, parabola, etc. This parabolic concentrator element 1600 with rectangular input and output surfaces thereby achieves better pupil matching. The rectangular input surface may preferably then be designed with an aspect ratio that matches that of the imager (imaging device), for example, 16:9. This configuration provides better far-field uniformity as more uniform and evenly spread intermediate images are formed when viewing at a distance which ultimately helps reduce hot spots.

The above-mentioned alternatives (e.g. number, size, and/or location of side surface portions, as well as various input/output surface shapes) for the concentrator element 16 may similarly be contemplated for concentrator element 1600.

The concentrator element 16 may either have a substantially parabolic cross section, a cross section which is a portion of a substantially hyperbolic shape, a cross section which is a portion of a substantially elliptical shape, or combinations thereof.

The DLP system 100 preferably further comprises an optical combiner element 40, wherein the output surface of each concentrator element 16 is positioned substantially adjacent to a corresponding side of the combiner element 40, and wherein the combiner element 40 spatially combines the substantially uniform light provided at the output surface of each concentrator element 16 so as to form substantially white light at an output surface of the combiner element 40.

The combiner element 40 preferably is a combiner cube which preferably comprises 4 prisms which are preferably composed of plastic, glass, polymer, or combinations thereof, with BK7 glass being the more preferred material. Dichroic coatings are preferably positioned between the prisms. The combiner element 40 preferably has an antireflective coating on the outside surfaces thereof. The combiner cube may be the type which is known in the art as an "X-Cube". Although other types of combiner elements may be contemplated.

In the configuration shown in FIG. 6, the combiner element allows red light from the left concentrator element 16 to be reflected downward, while being transmissive to green and blue from the other concentrator elements 16. Similarly, the same combiner element allows blue light from the right concentrator element 16 to be reflected downward, while being transmissive to green and red from the other concentrator elements 16. However, the same combiner element is transmissive for allowing the green light from the top concentrator element 16 to be transmitted downward. Of course, the locations of these colors may be varied or switched.

The plurality of LED arrays preferably consists of 3 LED arrays, wherein the 3 LED arrays preferably consist of 3 single-color LED arrays, and wherein each of the 3 single-color LED arrays is preferably of a different color from one another. More preferably, the 3 single-color LED arrays consist of an LED array consisting of only red LEDs, an LED array consisting of only green LEDs, and an LED array consisting of only blue LEDs. However, multi-color LED arrays (i.e. an LED array having multi-colored LEDs within the same LED array) may alternatively be contemplated.

Figure 10:
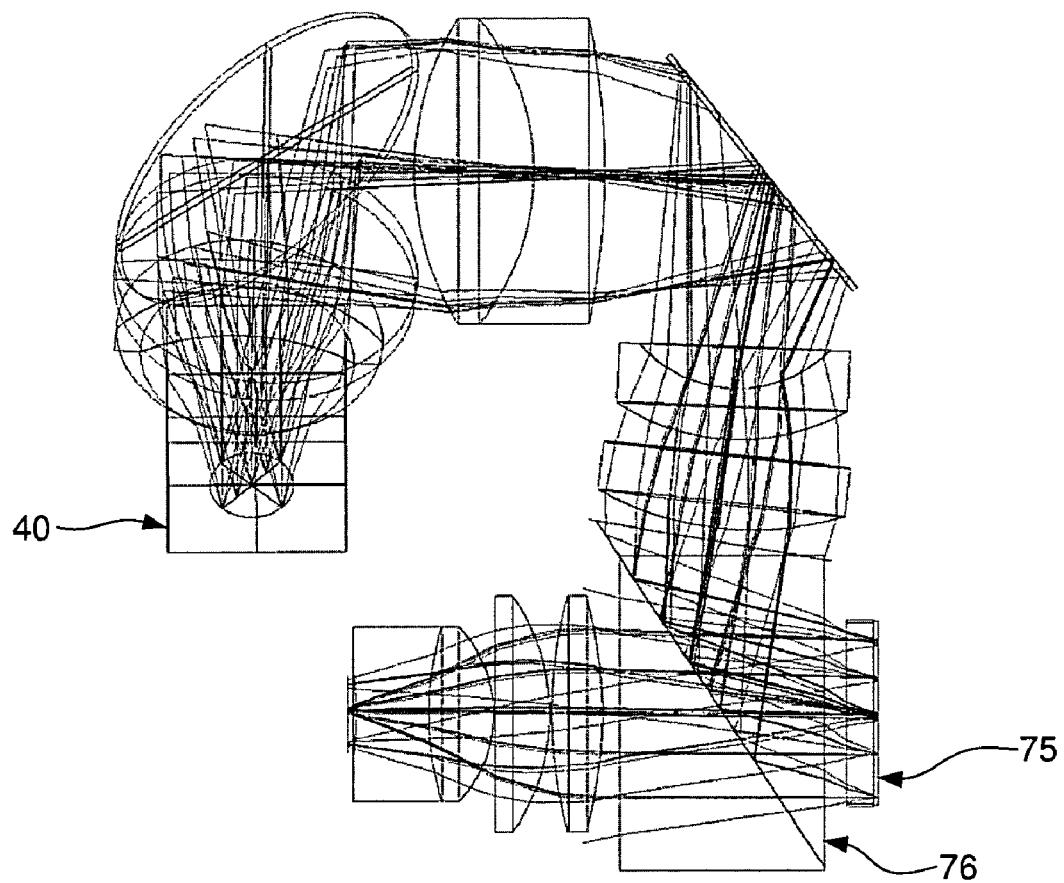
FIG. 10 is a plan view of a portion of the digital light projection system shown in FIG. 1, including the optical combiner element, illumination optics, total internal reflection (TIR) prism, digital imaging device, and projection optics.
Figure 11:
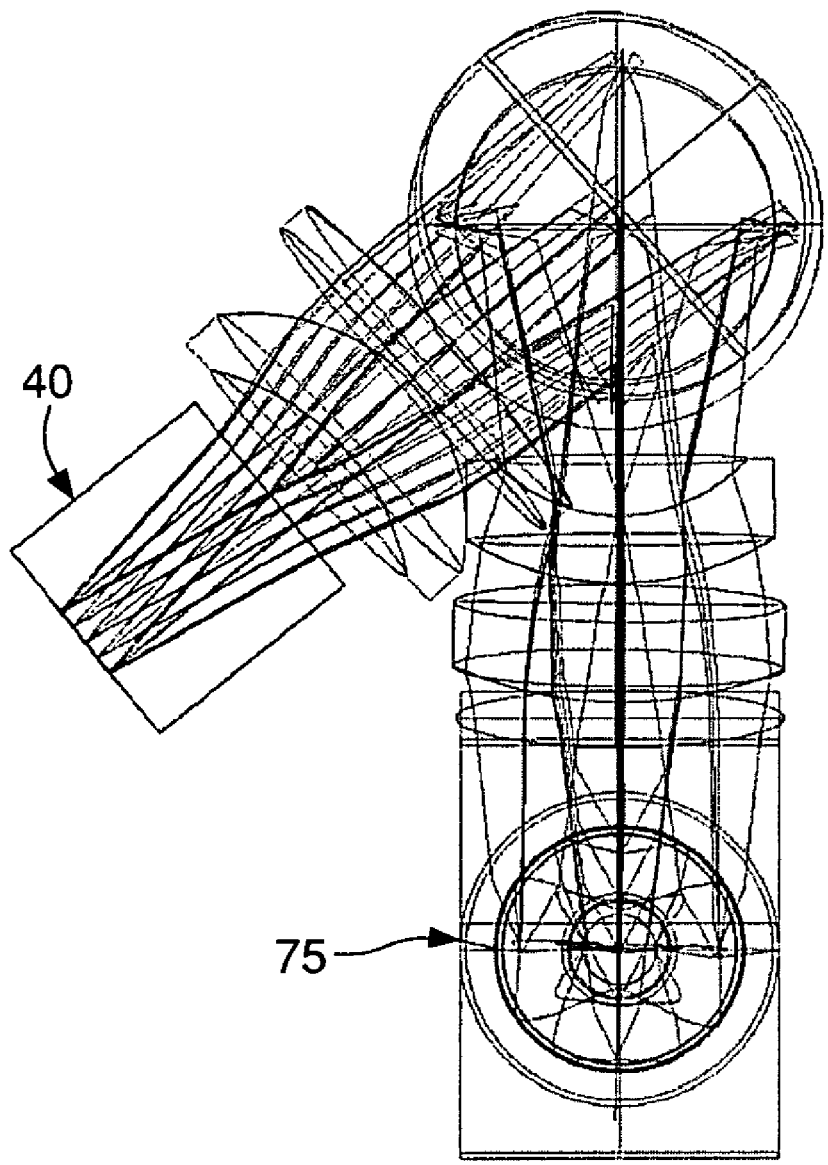
FIG. 11 is a left side view of the configuration shown in FIG. 10.
Figure 12:
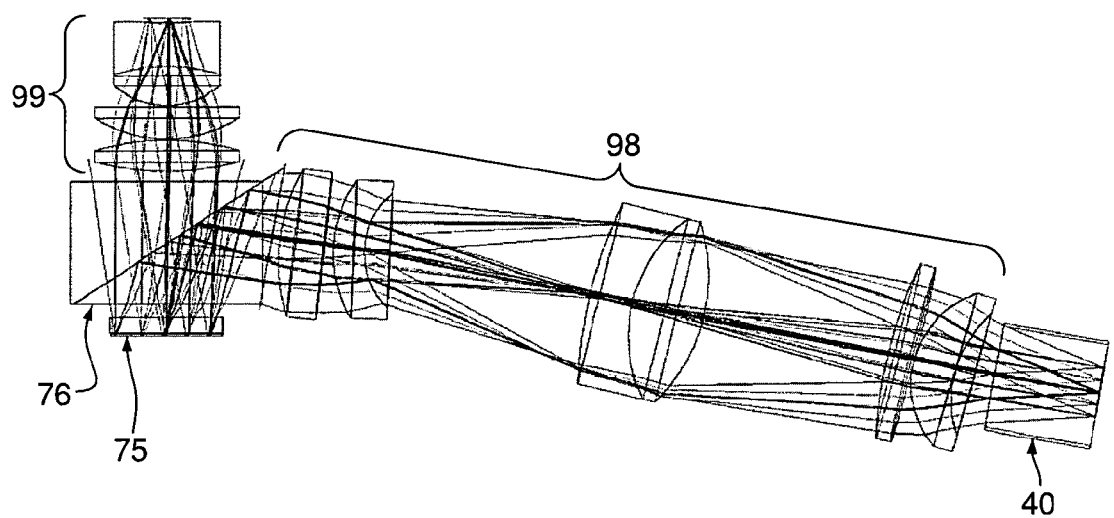
FIG. 12 is an unfolded plan view of the configuration shown in FIG. 10.

FIG. 10 is a plan view of a portion of the DLP system 100 shown in FIG. 1, including the optical combiner element 40, TIR cube 76 (e.g. preferably comprising 2 prisms with preferably an air interface (gap) therebetween), and digital imaging device 75. Sample ray traces are also illustrated in FIGS. 10-12. FIG. 11 is a left side view of the configuration shown in FIG. 10. FIG. 12 is an unfolded plan view of the configuration shown in FIG. 10. FIG. 12 also identifies the optical system which comprises illumination optics 98 and projection optics 99 portions of the DLP system 100.

Commonly available optical design software such as, for example, ZEMAX (Focus Software, Inc.) may be used to assist in describing the various characteristics (e.g. radius, thickness, glass type, diameter, and whether the surface is conic) corresponding to each surface region of each individual elements/groups within the optical system. In the preferred exemplary configuration shown in FIGS. 10 and 11, the ZEMAX software outputs surface data describing these surface characteristics as illustrated in Tables 1 and 2. Table 1 specifically illustrates data corresponding to the illumination optics 98 portion of the DLP system 100 while Table 2 specifically illustrates data corresponding to the projection optics 99 portion of the DLP system 100.

Of course, other surface data values for each individual element/group will become apparent to those of ordinary skill in the art in light of the present disclosure and may therefore be determined through routine experimentation dependent, inter alia, on the overall configuration and positioning of the individual elements/groups within the optical system, and the quality of the image desired.

TABLE 1

ZEMAX Software Output Describing Surface Data Summary and Detail for Each Individual Element within the Illumination Optical System 98

GENERAL LENS DATA:

Surfaces: 58
Stop: 18
System Aperture: Object Space NA = 0.342
Telecentric Mode: On
Glass Catalogs: OHARA SCHOTT
Ray Aiming: Off
Apodization: Uniform, factor = 0.00000E+000
Effective Focal Length: 8.441475 (in air at system temperature and pressure)
Effective Focal Length: 8.441475 (in image space)
Back Focal Length: −1.62518
Total Track: 103.0885
Image Space F/#: 1.159715e−009

TABLE 1-continued

ZEMAX Software Output Describing Surface Data Summary and Detail for Each Individual Element within the Illumination Optical System 98

Paraxial Working F/#: 3.000081
Working F/#: 3.786189
Image Space NA: 0.1643947
Object Space NA: 0.342
Stop Radius: −14.12827
Paraxial Image Height: 10.26355
Paraxial Magnification: −2.183735
Entrance Pupil Diameter: 7.278919e+009
Entrance Pupil Position: 1e+010
Exit Pupil Diameter: 6.144481
Exit Pupil Position: −0.7151799
Field Type: Object height in Millimeters
Maximum Field: 4.7
Primary Wave: 0.525
Lens Units: Millimeters
Angular Magnification: 1.184627e+009

Fields: 8
Field Type: Object height in Millimeters

| # | X-Value | Y-Value | Weight |
|---|---|---|---|
| 1 | 0.000000 | −4.700000 | 1.000000 |
| 2 | −4.700000 | 0.000000 | 1.000000 |
| 3 | 0.000000 | 0.000000 | 1.000000 |
| 4 | 0.000000 | 4.700000 | 1.000000 |
| 5 | −4.700000 | 0.000000 | 1.000000 |
| 6 | 0.000000 | 2.350000 | 1.000000 |
| 7 | 0.000000 | −2.350000 | 1.000000 |
| 8 | 4.680000 | 0.000000 | 1.000000 |

Vignetting Factors

| # | VDX | VDY | VCX | VCY | VAN |
|---|---|---|---|---|---|
| 1 | 0.000000 | 0.000000 | 0.000000 | 0.000000 | 0.000000 |
| 2 | 0.000000 | 0.000000 | 0.000000 | 0.000000 | 0.000000 |
| 3 | 0.000000 | 0.000000 | 0.000000 | 0.000000 | 0.000000 |
| 4 | 0.000000 | 0.000000 | 0.000000 | 0.000000 | 0.000000 |
| 5 | 0.000000 | 0.000000 | 0.000000 | 0.000000 | 0.000000 |
| 6 | 0.000000 | 0.000000 | 0.000000 | 0.000000 | 0.000000 |
| 7 | 0.000000 | 0.000000 | 0.000000 | 0.000000 | 0.000000 |
| 8 | 0.000000 | 0.000000 | 0.000000 | 0.000000 | 0.000000 |

Wavelengths: 3
Units: μm

| # | Value | Weight |
|---|---|---|
| 1 | 0.460000 | 0.100000 |
| 2 | 0.525000 | 0.100000 |
| 3 | 0.638000 | 0.100000 |

SURFACE DATA SUMMARY:

| Surf | Type | Comment | Radius | Thickness | Glass | Diameter | Conic |
|---|---|---|---|---|---|---|---|
| OBJ | TILTSURF | | — | −0.1 | | 9.4 | — |
| 1 | COORDBRK | | — | 0 | | — | — |
| 2 | COORDBRK | | — | 0 | | — | — |
| 3 | STANDARD | | Infinity | −20 | BK7 | 9.946429 | 0 |
| 4 | STANDARD | | Infinity | 0 | | 19.67943 | 0 |
| 5 | COORDBRK | | — | −8.5 | | — | — |
| 6 | COORDBRK | | — | 0 | | — | — |
| 7 | STANDARD | | 21.71 | −7.891024 | S-TIM5 | 24 | 0 |
| 8 | STANDARD | | 18.25 | −0.5 | | 30 | 0 |
| 9 | COORDBRK | | — | 0 | | — | — |
| 10 | STANDARD | | Infinity | −4.557022 | S-LAH66 | 34 | 0 |
| 11 | STANDARD | | 88.4428 | −20 | | 34 | 0 |
| 12 | COORDBRK | | — | 0 | | — | — |
| 13 | STANDARD | | Infinity | 0 | MIRROR | 48.54833 | 0 |
| 14 | COORDBRK | | — | 15 | | — | — |
| 15 | COORDBRK | | — | 0 | | — | — |
| 16 | STANDARD | | 33.39 | 13.54779 | S-PHM52 | 35 | 0 |
| 17 | STANDARD | | −27.48 | 8 | S-TIH6 | 35 | 0 |
| STO | STANDARD | | −86.487 | 18 | | 30.58858 | 0 |
| 19 | COORDBRK | | — | 0 | | — | — |

TABLE 1-continued

ZEMAX Software Output Describing Surface Data Summary and Detail for Each Individual Element within the Illumination Optical System 98

| | | | | | | |
|---|---|---|---|---|---|---|
| 20 | STANDARD | Infinity | 0 | MIRROR | 32.50427 | 0 |
| 21 | COORDBRK | — | −25 | | — | — |
| 22 | COORDBRK | — | 0 | | — | — |
| 23 | STANDARD | 14.454 | −5.741131 | S-LAH66 | 21.5 | 0 |
| 24 | STANDARD | 24.38 | −1.792458 | | 26 | 0 |
| 25 | COORDBRK | — | 0 | | — | — |
| 26 | STANDARD | Infinity | −8.394174 | S-LAH66 | 26.89927 | 0 |
| 27 | STANDARD | 35.2 | −1.5 | | 27.97676 | 0 |
| 28 | COORDBRK | — | 0 | | — | — |
| 29 | STANDARD | Infinity | 0 | | 27.73099 | 0 |
| 30 | STANDARD | Infinity | 0 | BK7 | 27.73099 | 0 |
| 31 | COORDBRK | — | 0 | | — | — |
| 32 | COORDBRK | — | 0 | | — | — |
| 33 | STANDARD | Infinity | 0 | MIRROR | 46.07963 | 0 |
| 34 | COORDBRK | — | 0 | | — | — |
| 35 | COORDBRK | — | 0 | | — | — |
| 36 | STANDARD | Infinity | 2.5 | | 23.09484 | 0 |
| 37 | STANDARD | Infinity | 3 | FK5 | 19.75174 | 0 |
| 38 | STANDARD | Infinity | 0.5 | | 20.79397 | 0 |
| 39 | STANDARD | Infinity | 0 | | 21.06476 | 0 |
| 40 | COORDBRK | — | 0 | | — | — |
| 41 | PARAXIAL | — | 0 | | 9369.208 | — |
| 42 | COORDBRK | — | — | | — | — |
| 43 | PARAXIAL | — | 0 | | 21.06476 | — |
| 44 | STANDARD | Infinity | −0.5 | MIRROR | 21.06476 | 0 |
| 45 | STANDARD | Infinity | −3 | FK5 | 20.86724 | 0 |
| 46 | STANDARD | Infinity | −2.5 | | 21.35858 | 0 |
| 47 | STANDARD | Infinity | −23 | BK7 | 22.46585 | 0 |
| 48 | STANDARD | Infinity | −2 | | 29.18505 | 0 |
| 49 | STANDARD | −49.071 | −5.7785 | S-PHM53 | 27 | 0 |
| 50 | STANDARD | 49.071 | −0.2 | | 27 | 0 |
| 51 | STANDARD | −23.88 | −6.194 | S-BSM81 | 27 | 0 |
| 52 | STANDARD | Infinity | −0.2 | | 27 | 0 |
| 53 | STANDARD | −14.732 | −7.297 | S-FSL5 | 20 | 0 |
| 54 | STANDARD | 35.2 | −8.181 | S-TIH6 | 20 | 0 |
| 55 | STANDARD | −32 | −0.91 | | 9.749377 | 0 |
| 56 | STANDARD | Infinity | 0 | | 8.773558 | 0 |
| 57 | STANDARD | Infinity | 0 | | 8.773558 | 0 |
| IMA | STANDARD | Infinity | | | 8.35577 | 0 |

SURFACE DATA DETAIL:

Surface OBJ: TILTSURF
X Tangent: 0
Y Tangent: 0
Surface 1: COORDBRK
Decenter X: 0
Decenter Y: 0
Tilt About X: 0
Tilt About Y: 0
Tilt About Z: −131
Order: Decenter then tilt
Surface 2: COORDBRK
Decenter X: 0
Decenter Y: 0
Tilt About X: 0
Tilt About Y: 0
Tilt About Z: −2.9
Order: Decenter then tilt
Surface 3: STANDARD
Aperture: Rectangular Aperture
X Half Width: 10
Y Half Width: 10
X - Decenter: 0
Y - Decenter: −0.5
Surface 4: STANDARD
Aperture: Rectangular Aperture
X Half Width: 10
Y Half Width: 10
X - Decenter: 0
Y - Decenter: −0.5
Surface 5: COORDBRK
Decenter X: −5.2218237
Decenter Y: 0.54365794
Tilt About X: 1.9041816
Tilt About Y: −15.502077
Tilt About Z: 2.9

TABLE 1-continued

ZEMAX Software Output Describing Surface Data Summary and Detail for Each Individual Element within the Illumination Optical System 98

Order: Decenter then tilt
Surface 6: COORDBRK
Decenter X: 3.3921034
Decenter Y: −0.66705067
Tilt About X: −5.3573672
Tilt About Y: 19.739401
Tilt About Z: 0
Order: Decenter then tilt
Surface 7: STANDARD
Aperture: Circular Aperture
Minimum Radius: 0
Maximum Radius: 12
Surface 8: STANDARD
Aperture: Circular Aperture
Minimum Radius: 0
Maximum Radius: 15
Surface 9: COORDBRK
Decenter X: 0.14501681
Decenter Y: −1.0712542
Tilt About X: −0.066043177
Tilt About Y: −2.1064114
Tilt About Z: 0
Order: Decenter then tilt
Surface 10: STANDARD
Aperture: Circular Aperture
Minimum Radius: 0
Maximum Radius: 17
Surface 11: STANDARD
Aperture: Circular Aperture
Minimum Radius: 0
Maximum Radius: 17
Surface 12: COORDBRK
Decenter X: 0
Decenter Y: 0
Tilt About X: 47.8
Tilt About Y: 0
Tilt About Z: 0
Order: Decenter then tilt
Surface 13: STANDARD
Aperture: Elliptical Aperture
X Half Width: 17
Y Half Width: 23
X - Decenter: 0
Y - Decenter: 2.5
Surface 14: COORDBRK
Decenter X: 0
Decenter Y: 0
Tilt About X: 47.8
Tilt About Y: 0
Tilt About Z: 0
Order: Decenter then tilt
Surface 15: COORDBRK
Decenter X: 0.99137317
Decenter Y: 3.376614
Tilt About X: −1.475471
Tilt About Y: −0.81685172
Tilt About Z: 131
Order: Decenter then tilt
Surface 16: STANDARD
Aperture: Circular Aperture
Minimum Radius: 0
Maximum Radius: 17.5
Surface 17: STANDARD
Aperture: Circular Aperture
Minimum Radius: 0
Maximum Radius: 17.5
Surface STO: STANDARD
Aperture: Circular Aperture
Minimum Radius: 0
Maximum Radius: 17.5
Surface 19: COORDBRK
Decenter X: 0
Decenter Y: 0
Tilt About X: −38.08
Tilt About Y: 0
Tilt About Z: 0
Order: Decenter then tilt TABLE 1-continued ZEMAX Software Output Describing Surface Data Summary and Detail for Each
Individual Element within the Illumination Optical System 98

Surface 20: STANDARD
Aperture: Elliptical Aperture
X Half Width: 13.5
Y Half Width: 17
Surface 21: COORDBRK
Decenter X: 0
Decenter Y: 0
Tilt About X: −38.08
Tilt About Y: 0
Tilt About Z: 0
Order: Decenter then tilt
Surface 22: COORDBRK
Decenter X: −0.47489395
Decenter Y: −2.5440208
Tilt About X: −11.395468
Tilt About Y: 0.41607589
Tilt About Z: 0
Order: Decenter then tilt
Surface 23: STANDARD
Aperture: Circular Aperture
Minimum Radius: 0
Maximum Radius: 10.75
Surface 24: STANDARD
Aperture: Circular Aperture
Minimum Radius: 0
Maximum Radius: 13
Surface 25: COORDBRK
Decenter X: 0.14410789
Decenter Y: 0.37194946
Tilt About X: 4.0907234
Tilt About Y: −1.1395971
Tilt About Z: 0
Order: Decenter then tilt
Surface 26: STANDARD
Aperture: Circular Aperture
Minimum Radius: 0
Maximum Radius: 14
Surface 27: STANDARD
Aperture: Circular Aperture
Minimum Radius: 0
Maximum Radius: 14
Surface 28: COORDBRK
Decenter X: −0.19341404
Decenter Y: 0.80152634
Tilt About X: 3.4489226
Tilt About Y: 0.68325579
Tilt About Z: 0
Order: Decenter then tilt
Surface 29: STANDARD
Surface 30: STANDARD
Aperture: Rectangular Aperture
X Half Width: 13.5
Y Half Width: 13.03
Surface 31: COORDBRK
Decenter X: 0
Decenter Y: 13.03
Tilt About X: 47
Tilt About Y: 0
Tilt About Z: 0
Order: Decenter then tilt
Surface 32: COORDBRK
Decenter X: 0
Decenter Y: −23.565
Tilt About X: 0
Tilt About Y: 0
Tilt About Z: 0
Order: Decenter then tilt
Surface 33: STANDARD
Aperture: Rectangular Aperture
X Half Width: 13.5
Y Half Width: 23.57
Surface 34: COORDBRK
Decenter X: 0
Decenter Y: −23.565
Tilt About X: 33
Tilt About Y: 0
Tilt About Z: 0

TABLE 1-continued

ZEMAX Software Output Describing Surface Data Summary and Detail for Each
Individual Element within the Illumination Optical System 98

Order: Decenter then tilt
Surface 35: COORDBRK
Decenter X: 0
Decenter Y: 17.5
Tilt About X: 0
Tilt About Y: 0
Tilt About Z: 0
Order: Decenter then tilt
Surface 36: STANDARD
Aperture: Rectangular Aperture
X Half Width: 13.5
Y Half Width: 17.5
Surface 37: STANDARD
Surface 38: STANDARD
Surface 39: STANDARD
Surface 40: COORDBRK
Decenter X: 0
Decenter Y: 4451.5
Tilt About X: 0
Tilt About Y: 0
Tilt About Z: 0
Order: Decenter then tilt
Surface 41: PARAXIAL
Focal length: −10000
OPD Mode: 0
Surface 42: COORDBRK
Decenter X: 0
Decenter Y: −4451.5
Tilt About X: 0
Tilt About Y: 0
Tilt About Z: 0
Order: Decenter then tilt
Surface 43: PARAXIAL
Focal length: 0
OPD Mode: 0
Surface 44: STANDARD
Surface 45: STANDARD
Surface 46: STANDARD
Surface 47: STANDARD
Aperture: Rectangular Aperture
X Half Width: 13.5
Y Half Width: 18
Surface 48: STANDARD
Aperture: Rectangular Aperture
X Half Width: 13.5
Y Half Width: 18
Surface 49: STANDARD
Aperture: Circular Aperture
Minimum Radius: 0
Maximum Radius: 13
Surface 50: STANDARD
Aperture: Floating Aperture
Maximum Radius: 13.5
Surface 51: STANDARD
Aperture: Floating Aperture
Maximum Radius: 13.5
Surface 52: STANDARD
Aperture: Floating Aperture
Maximum Radius: 13.5
Surface 53: STANDARD
Aperture: Floating Aperture
Maximum Radius: 10
Surface 54: STANDARD
Aperture: Floating Aperture
Maximum Radius: 10
Surface 55: STANDARD
Surface 56: STANDARD
Surface 57: STANDARD
Aperture: Circular Aperture
Minimum Radius: 0
Maximum Radius: 3.06
Surface IMA: STANDARD

TABLE 1-continued

ZEMAX Software Output Describing Surface Data Summary and Detail for Each Individual Element within the Illumination Optical System 98

COATING DEFINITIONS:
PHYSICAL OPTICS PROPAGATION SETTINGS SUMMARY:

OBJ TILTSURF

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
1 COORDBRK Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
2 COORDBRK Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
3 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
4 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
5 COORDBRK Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
6 COORDBRK Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
7 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
8 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit TABLE 1-continued ZEMAX Software Output Describing Surface Data Summary and Detail for Each
Individual Element within the Illumination Optical System 98

9 COORDBRK

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
10 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
11 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
12 COORDBRK Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
13 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
14 COORDBRK Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
15 COORDBRK Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
16 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
17 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
STO STANDARD Use Rays To Propagate To Next Surface: Off
Recompute Pilot Beam: Off
Do Not Rescale Beam Size Using Ray Data: Off TABLE 1-continued ZEMAX Software Output Describing Surface Data Summary and Detail for Each
Individual Element within the Illumination Optical System 98

Use Angular Spectrum Propagator: Off
Use Parallel Probing Rays: Off
Reference Radius: Best Fit
19 COORDBRK Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
20 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
21 COORDBRK Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
22 COORDBRK Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
23 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
24 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
25 COORDBRK Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
26 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
27 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

TABLE 1-continued

ZEMAX Software Output Describing Surface Data Summary and Detail for Each Individual Element within the Illumination Optical System 98

28 COORDBRK

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
29 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
30 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
31 COORDBRK Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
32 COORDBRK Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
33 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
34 COORDBRK Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
35 COORDBRK Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
36 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
37 STANDARD Use Rays To Propagate To Next Surface: Off
Recompute Pilot Beam: Off
Do Not Rescale Beam Size Using Ray Data: Off TABLE 1-continued ZEMAX Software Output Describing Surface Data Summary and Detail for Each
Individual Element within the Illumination Optical System 98

Use Angular Spectrum Propagator: Off
Use Parallel Probing Rays: Off
Reference Radius: Best Fit
38 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
39 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
40 COORDBRK Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
41 PARAXIAL Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
42 COORDBRK Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
43 PARAXIAL Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
44 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
45 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
46 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit TABLE 1-continued ZEMAX Software Output Describing Surface Data Summary and Detail for Each
Individual Element within the Illumination Optical System 98

47 STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
48 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
49 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
50 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
51 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
52 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
53 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
54 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
55 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
56 STANDARD Use Rays To Propagate To Next Surface: Off
Recompute Pilot Beam: Off
Do Not Rescale Beam Size Using Ray Data: Off TABLE 1-continued ZEMAX Software Output Describing Surface Data Summary and Detail for Each Individual Element within the Illumination Optical System 98

Use Angular Spectrum Propagator: Off
Use Parallel Probing Rays: Off
Reference Radius: Best Fit
57 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
IMA STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

EDGE THICKNESS DATA:

| Surf | X-Edge | Y-Edge |
| --- | --- | --- |
| OBJ | −0.100000 | −0.100000 |
| 1 | 0.000000 | 0.000000 |
| 2 | 0.000000 | 0.000000 |
| 3 | −20.000000 | −20.000000 |
| 4 | 0.000000 | 0.000000 |
| 5 | −8.500000 | −8.500000 |
| 6 | 3.617900 | 3.617900 |
| 7 | −3.654235 | −3.654235 |
| 8 | −8.354689 | −8.354689 |
| 9 | 0.000000 | 0.000000 |
| 10 | −2.907821 | −2.907821 |
| 11 | −21.649201 | −21.649201 |
| 12 | 0.000000 | 0.000000 |
| 13 | 0.000000 | 0.000000 |
| 14 | 15.000000 | 15.000000 |
| 15 | 4.953367 | 4.953367 |
| 16 | 2.301690 | 2.301690 |
| 17 | 12.929674 | 12.929674 |
| STO | 19.363056 | 19.363056 |
| 19 | 0.000000 | 0.000000 |
| 20 | 0.000000 | 0.000000 |
| 21 | −25.000000 | −25.000000 |
| 22 | 4.791929 | 4.791929 |
| 23 | −6.777909 | −6.777909 |
| 24 | −5.547609 | −5.547609 |
| 25 | 0.000000 | 0.000000 |
| 26 | −5.495339 | −5.495339 |
| 27 | −4.398835 | −4.398835 |
| 28 | 0.000000 | 0.000000 |
| 29 | 0.000000 | 0.000000 |
| 30 | 0.000000 | 0.000000 |
| 31 | 0.000000 | 0.000000 |
| 32 | 0.000000 | 0.000000 |
| 33 | 0.000000 | 0.000000 |
| 34 | 0.000000 | 0.000000 |
| 35 | 0.000000 | 0.000000 |
| 36 | 2.500000 | 2.500000 |
| 37 | 3.000000 | 3.000000 |
| 38 | 0.500000 | 0.500000 |
| 39 | 0.000000 | 0.000000 |
| 40 | 0.000000 | 0.000000 |
| 41 | 0.000000 | 0.000000 |
| 42 | 0.000000 | 0.000000 |
| 43 | 0.000000 | 0.000000 |
| 44 | −0.500000 | −0.500000 |
| 45 | −3.000000 | −3.000000 |
| 46 | −2.500000 | −2.500000 |
| 47 | −23.000000 | −23.000000 |
| 48 | −3.893537 | −3.893537 |
| 49 | −1.991427 | −1.991427 |
| 50 | −6.275709 | −6.275709 |
| 51 | −2.011827 | −2.011827 |
| 52 | −4.113875 | −4.113875 |

TABLE 1-continued

ZEMAX Software Output Describing Surface Data Summary and Detail for Each Individual Element within the Illumination Optical System 98

| | | |
|---|---|---|
| 53 | −1.932791 | −1.932791 |
| 54 | −10.004803 | −10.004803 |
| 55 | −0.536530 | −0.536530 |
| 56 | 0.000000 | 0.000000 |
| 57 | 0.000000 | 0.000000 |
| IMA | 0.000000 | 0.000000 |

MULTI-CONFIGURATION DATA:
Configuration 1:

1 Y-field 1: −4.7
2 X-field 2: −4.7 Pick up from configuration 1, operand 1, scale 1, offset 0
3 Y-field 4: 4.7 Pick up from configuration 1, operand 1, scale −1, offset 0
4 X-field 5: −4.7 Pick up from configuration 1, operand 1, scale 1, offset 0
5 Y-field 6: 2.35 Pick up from configuration 1, operand 1, scale −0.5, offset 0
6 Y-field 7: −2.35 Pick up from configuration 1, operand 1, scale 0.5, offset 0
7 Aperture: 0.342

SOLVE AND VARIABLE DATA:

Parameter 1 Surf 5: Variable
Parameter 2 Surf 5: Variable
Parameter 3 Surf 5: Variable
Parameter 4 Surf 5: Variable
Parameter 5 Surf 5: Pickup from 2 times −1.000000, plus 0.000000
Parameter 1 Surf 6: Variable
Parameter 2 Surf 6: Variable
Parameter 3 Surf 6: Variable
Parameter 4 Surf 6: Variable
Thickness of 7: Variable
Semi Diameter 7: Fixed
Semi Diameter 8: Fixed
Parameter 1 Surf 9: Variable
Parameter 2 Surf 9: Variable
Parameter 3 Surf 9: Variable
Parameter 4 Surf 9: Variable
Thickness of 10: Variable
Semi Diameter 10: Fixed
Semi Diameter 11: Fixed
Parameter 3 Surf 14: Pickup from 12 times 1.000000, plus 0.000000
Parameter 1 Surf 15: Variable
Parameter 2 Surf 15: Variable
Parameter 3 Surf 15: Variable
Parameter 4 Surf 15: Variable
Parameter 5 Surf 15: Pickup from 1 times −1.000000, plus 0.000000
Thickness of 16: Variable
Semi Diameter 16: Fixed
Semi Diameter 17: Fixed
Parameter 3 Surf 21: Pickup from 19 times 1.000000, plus 0.000000
Parameter 1 Surf 22: Variable
Parameter 2 Surf 22: Variable
Parameter 3 Surf 22: Variable
Parameter 4 Surf 22: Variable
Thickness of 23: Variable
Semi Diameter 23: Fixed
Thickness of 24: Variable
Semi Diameter 24: Fixed
Parameter 1 Surf 25: Variable
Parameter 2 Surf 25: Variable
Parameter 3 Surf 25: Variable
Parameter 4 Surf 25: Variable
Thickness of 26: Variable
Parameter 1 Surf 28: Variable
Parameter 2 Surf 28: Variable
Parameter 3 Surf 28: Variable
Parameter 4 Surf 28: Variable
Parameter 2 Surf 34: Pickup from 32 times 1.000000, plus 0.000000
Parameter 1 Surf 42: Pickup from 40 times −1.000000, plus 0.000000
Parameter 2 Surf 42: Pickup from 40 times −1.000000, plus 0.000000
Thickness of 44: Solve, pick up value from 38, scaled by −1.00000, plus 0.00000
Semi Diameter 49: Fixed
Curvature of 50: Solve, pick up value from 49, scaled by −1.00000
Semi Diameter 50: Pickup from 49
Semi Diameter 51: Fixed
Semi Diameter 52: Fixed
Semi Diameter 53: Fixed
Semi Diameter 54: Fixed TABLE 1-continued ZEMAX Software Output Describing Surface Data Summary and Detail for Each
Individual Element within the Illumination Optical System 98

Config 1, Oper 2 X-field 2: −4.7 Pick up from configuration 1, operand 1, scale 1, offset 0
Config 1, Oper 3 Y-field 4: 4.7 Pick up from configuration 1, operand 1, scale −1, offset 0
Config 1, Oper 4 X-field 5: −4.7 Pick up from configuration 1, operand 1, scale 1, offset 0
Config 1, Oper 5 Y-field 6: 2.35 Pick up from configuration 1, operand 1, scale −0.5, offset 0
Config 1, Oper 6 Y-field 7: −2.35 Pick up from configuration 1, operand 1, scale 0.5, offset 0

INDEX OF REFRACTION DATA:

| Surf | Glass | Temp | Pres | 0.460000 | 0.525000 | 0.638000 |
|---|---|---|---|---|---|---|
| 0 |  | 20.00 | 1.00 | 1.00000000 | 1.00000000 | 1.00000000 |
| 1 | <CRD BRK> |  |  | 1.00000000 | 1.00000000 | 1.00000000 |
| 2 | <CRD BRK> |  |  | 1.00000000 | 1.00000000 | 1.00000000 |
| 3 | BK7 | 20.00 | 1.00 | 1.52443350 | 1.51986781 | 1.51491301 |
| 4 |  | 20.00 | 1.00 | 1.00000000 | 1.00000000 | 1.00000000 |
| 5 | <CRD BRK> |  |  | 1.00000000 | 1.00000000 | 1.00000000 |
| 6 | <CRD BRK> |  |  | 1.00000000 | 1.00000000 | 1.00000000 |
| 7 | S-TIM5 | 25.00 | 1.00 | 1.61896887 | 1.60946991 | 1.59984226 |
| 8 |  | 20.00 | 1.00 | 1.00000000 | 1.00000000 | 1.00000000 |
| 9 | <CRD BRK> |  |  | 1.00000000 | 1.00000000 | 1.00000000 |
| 10 | S-LAH66 | 25.00 | 1.00 | 1.78746088 | 1.77844022 | 1.76890908 |
| 11 |  | 20.00 | 1.00 | 1.00000000 | 1.00000000 | 1.00000000 |
| 12 | <CRD BRK> |  |  | 1.00000000 | 1.00000000 | 1.00000000 |
| 13 | MIRROR | 20.00 | 1.00 | 1.00000000 | 1.00000000 | 1.00000000 |
| 14 | <CRD BRK> |  |  | 1.00000000 | 1.00000000 | 1.00000000 |
| 15 | <CRD BRK> |  |  | 1.00000000 | 1.00000000 | 1.00000000 |
| 16 | S-PHM52 | 25.00 | 1.00 | 1.62732483 | 1.62172274 | 1.61573794 |
| 17 | S-TIH6 | 25.00 | 1.00 | 1.83685381 | 1.81725141 | 1.79821004 |
| 18 |  | 20.00 | 1.00 | 1.00000000 | 1.00000000 | 1.00000000 |
| 19 | <CRD BRK> |  |  | 1.00000000 | 1.00000000 | 1.00000000 |
| 20 | MIRROR | 20.00 | 1.00 | 1.00000000 | 1.00000000 | 1.00000000 |
| 21 | <CRD BRK> |  |  | 1.00000000 | 1.00000000 | 1.00000000 |
| 22 | <CRD BRK> |  |  | 1.00000000 | 1.00000000 | 1.00000000 |
| 23 | S-LAH66 | 25.00 | 1.00 | 1.78746088 | 1.77844022 | 1.76890908 |
| 24 |  | 20.00 | 1.00 | 1.00000000 | 1.00000000 | 1.00000000 |
| 25 | <CRD BRK> |  |  | 1.00000000 | 1.00000000 | 1.00000000 |
| 26 | S-LAH66 | 25.00 | 1.00 | 1.78746088 | 1.77844022 | 1.76890908 |
| 27 |  | 20.00 | 1.00 | 1.00000000 | 1.00000000 | 1.00000000 |
| 28 | <CRD BRK> |  |  | 1.00000000 | 1.00000000 | 1.00000000 |
| 29 |  | 20.00 | 1.00 | 1.00000000 | 1.00000000 | 1.00000000 |
| 30 | BK7 | 20.00 | 1.00 | 1.52443350 | 1.51986781 | 1.51491301 |
| 31 | <CRD BRK> |  |  | 1.52443350 | 1.51986781 | 1.51491301 |
| 32 | <CRD BRK> |  |  | 1.52443350 | 1.51986781 | 1.51491301 |
| 33 | MIRROR | 20.00 | 1.00 | 1.52443350 | 1.51986781 | 1.51491301 |
| 34 | <CRD BRK> |  |  | 1.52443350 | 1.51986781 | 1.51491301 |
| 35 | <CRD BRK> |  |  | 1.52443350 | 1.51986781 | 1.51491301 |
| 36 |  | 20.00 | 1.00 | 1.00000000 | 1.00000000 | 1.00000000 |
| 37 | FK5 | 20.00 | 1.00 | 1.49402111 | 1.49012584 | 1.48585830 |
| 38 |  | 20.00 | 1.00 | 1.00000000 | 1.00000000 | 1.00000000 |
| 39 |  | 20.00 | 1.00 | 1.00000000 | 1.00000000 | 1.00000000 |
| 40 | <CRD BRK> |  |  | 1.00000000 | 1.00000000 | 1.00000000 |
| 41 |  | 20.00 | 1.00 | 1.00000000 | 1.00000000 | 1.00000000 |
| 42 | <CRD BRK> |  |  | 1.00000000 | 1.00000000 | 1.00000000 |
| 43 |  | 20.00 | 1.00 | 1.00000000 | 1.00000000 | 1.00000000 |
| 44 | MIRROR | 20.00 | 1.00 | 1.00000000 | 1.00000000 | 1.00000000 |
| 45 | FK5 | 20.00 | 1.00 | 1.49402111 | 1.49012584 | 1.48585830 |
| 46 |  | 20.00 | 1.00 | 1.00000000 | 1.00000000 | 1.00000000 |
| 47 | BK7 | 20.00 | 1.00 | 1.52443350 | 1.51986781 | 1.51491301 |
| 48 |  | 20.00 | 1.00 | 1.00000000 | 1.00000000 | 1.00000000 |
| 49 | S-PHM53 | 25.00 | 1.00 | 1.61177822 | 1.60651481 | 1.60085657 |
| 50 |  | 20.00 | 1.00 | 1.00000000 | 1.00000000 | 1.00000000 |
| 51 | S-BSM81 | 25.00 | 1.00 | 1.65011121 | 1.64405670 | 1.63750734 |
| 52 |  | 20.00 | 1.00 | 1.00000000 | 1.00000000 | 1.00000000 |
| 53 | S-FSL5 | 25.00 | 1.00 | 1.49404408 | 1.49013274 | 1.48585674 |
| 54 | S-TIH6 | 25.00 | 1.00 | 1.83685381 | 1.81725141 | 1.79821004 |
| 55 |  | 20.00 | 1.00 | 1.00000000 | 1.00000000 | 1.00000000 |
| 56 |  | 20.00 | 1.00 | 1.00000000 | 1.00000000 | 1.00000000 |
| 57 |  | 20.00 | 1.00 | 1.00000000 | 1.00000000 | 1.00000000 |
| 58 |  | 20.00 | 1.00 | 1.00000000 | 1.00000000 | 1.00000000 |

THERMAL COEFFICIENT OF EXPANSION DATA:

| Surf | Glass | TCE * 10E−6 |
|---|---|---|
| 0 |  | 0.00000000 |
| 1 | <CRD BRK> | 0.00000000 |
| 2 | <CRD BRK> | 0.00000000 |

TABLE 1-continued

ZEMAX Software Output Describing Surface Data Summary and Detail for Each Individual Element within the Illumination Optical System 98

| | | |
|---|---|---|
| 3 | BK7 | 7.10000000 |
| 4 | | 0.00000000 |
| 5 | <CRD BRK> | 0.00000000 |
| 6 | <CRD BRK> | 0.00000000 |
| 7 | S-TIM5 | 8.30000000 |
| 8 | | 0.00000000 |
| 9 | <CRD BRK> | 0.00000000 |
| 10 | S-LAH66 | 6.20000000 |
| 11 | | 0.00000000 |
| 12 | <CRD BRK> | 0.00000000 |
| 13 | MIRROR | 0.00000000 |
| 14 | <CRD BRK> | 0.00000000 |
| 15 | <CRD BRK> | 0.00000000 |
| 16 | S-PHM52 | 10.10000000 |
| 17 | S-TIH6 | 8.90000000 |
| 18 | | 0.00000000 |
| 19 | <CRD BRK> | 0.00000000 |
| 20 | MIRROR | 0.00000000 |
| 21 | <CRD BRK> | 0.00000000 |
| 22 | <CRD BRK> | 0.00000000 |
| 23 | S-LAH66 | 6.20000000 |
| 24 | | 0.00000000 |
| 25 | <CRD BRK> | 0.00000000 |
| 26 | S-LAH66 | 6.20000000 |
| 27 | | 0.00000000 |
| 28 | <CRD BRK> | 0.00000000 |
| 29 | | 0.00000000 |
| 30 | BK7 | 7.10000000 |
| 31 | <CRD BRK> | 7.10000000 |
| 32 | <CRD BRK> | 7.10000000 |
| 33 | MIRROR | 0.00000000 |
| 34 | <CRD BRK> | 0.00000000 |
| 35 | <CRD BRK> | 0.00000000 |
| 36 | | 0.00000000 |
| 37 | FK5 | 9.20000000 |
| 38 | | 0.00000000 |
| 39 | | 0.00000000 |
| 40 | <CRD BRK> | 0.00000000 |
| 41 | | 0.00000000 |
| 42 | <CRD BRK> | 0.00000000 |
| 43 | | 0.00000000 |
| 44 | MIRROR | 0.00000000 |
| 45 | FK5 | 9.20000000 |
| 46 | | 0.00000000 |
| 47 | BK7 | 7.10000000 |
| 48 | | 0.00000000 |
| 49 | S-PHM53 | 9.30000000 |
| 50 | | 0.00000000 |
| 51 | S-BSM81 | 5.80000000 |
| 52 | | 0.00000000 |
| 53 | S-FSL5 | 9.00000000 |
| 54 | S-TIH6 | 8.90000000 |
| 55 | | 0.00000000 |
| 56 | | 0.00000000 |
| 57 | | 0.00000000 |
| 58 | | 0.00000000 |

F/# DATA:
F/# calculations consider vignetting factors and ignore surface apertures.

| | | Wavelength: | | | | | |
|---|---|---|---|---|---|---|---|
| | | 0.460000 | | 0.525000 | | 0.638000 | |
| # | Field | Tan | Sag | Tan | Sag | Tan | Sag |
| 1 | 0.0000, −4.7000 mm: | 4.8398 | 4.3748 | 4.4425 | 4.0018 | 4.2373 | 3.7817 |
| 2 | −4.7000, 0.0000 mm: | 3.8570 | 6.8070 | 3.5637 | 6.0899 | 3.3948 | 5.7508 |
| 3 | 0.0000, 0.0000 mm: | 3.8427 | 4.6147 | 3.5095 | 4.1546 | 3.3157 | 3.8884 |
| 4 | 0.0000, 4.7000 mm: | 9.9516 | 4.6933 | 8.4478 | 4.2863 | 7.9387 | 4.0561 |
| 5 | −4.7000, 0.0000 mm: | 3.8570 | 6.8070 | 3.5637 | 6.0899 | 3.3948 | 5.7508 |
| 6 | 0.0000, 2.3500 mm: | 4.6871 | 4.6396 | 4.2321 | 4.1943 | 3.9876 | 3.9387 |
| 7 | 0.0000, −2.3500 mm: | 3.9215 | 4.5231 | 3.5916 | 4.0869 | 3.3990 | 3.8313 |
| 8 | 4.6800, 0.0000 mm: | 3.7304 | 6.3593 | 3.4531 | 5.6840 | 3.2929 | 5.3537 |

TABLE 1-continued

ZEMAX Software Output Describing Surface Data Summary and Detail for Each Individual Element within the Illumination Optical System 98

GLOBAL VERTEX COORDINATES, ORIENTATIONS, AND ROTATION/OFFSET MATRICES:
Reference Surface: 35

| Surf | R11<br>R21<br>R31 | R12<br>R22<br>R32 | R13<br>R23<br>R33 | X<br>Y<br>Z |
|---|---|---|---|---|
| 0 | 0.4336132998<br>0.5349194913<br>−0.7251487047 | 0.4566178415<br>0.5633300907<br>0.6885923001 | 0.7768395285<br>−0.6296986158<br>0.0000136360 | 4.517843432E+001<br>4.369443138E+001<br>−6.445732627E+001 |
| 1 | −0.6290897799<br>−0.7760893783<br>−0.0439468507 | 0.0276838538<br>0.0341310725<br>−0.9990338704 | 0.7768395285<br>−0.6296986158<br>0.0000136360 | 4.510075037E+001<br>4.375740124E+001<br>−6.445732764E+001 |
| 2 | −0.6296847481<br>−0.7768222763<br>0.0066534903 | −0.0041791009<br>−0.0051772806<br>−0.9999778652 | 0.7768395285<br>−0.6296986158<br>0.0000136360 | 4.510075037E+001<br>4.375740124E+001<br>−6.445732764E+001 |
| 3 | −0.6296847481<br>−0.7768222763<br>0.0066534903 | −0.0041791009<br>−0.0051772806<br>−0.9999778652 | 0.7768395285<br>−0.6296986158<br>0.0000136360 | 4.510075037E+001<br>4.375740124E+001<br>−6.445732764E+001 |
| 4 | −0.6296847481<br>−0.7768222763<br>0.0066534903 | −0.0041791009<br>−0.0051772806<br>−0.9999778652 | 0.7768395285<br>−0.6296986158<br>0.0000136360 | 2.956395980E+001<br>5.635137355E+001<br>−6.445760036E+001 |
| 5 | −0.3976204718<br>−0.9168711729<br>−0.0352875716 | 0.0418064530<br>0.0203151008<br>−0.9989191745 | 0.9165970657<br>−0.3986659617<br>0.0302534317 | 3.284979056E+001<br>6.040498788E+001<br>−6.503598962E+001 |
| 6 | −0.6837956136<br>−0.7295767638<br>−0.0118871570 | −0.0439565517<br>0.0574488052<br>−0.9973802968 | 0.7283483921<br>−0.6814817536<br>−0.0713529197 | 2.368205873E+001<br>6.066997554E+001<br>−6.474651317E+001 |
| 7 | −0.6837956136<br>−0.7295767638<br>−0.0118871570 | −0.0439565517<br>0.0574488052<br>−0.9973802968 | 0.7283483921<br>−0.6814817536<br>−0.0713529197 | 2.368205873E+001<br>6.066997554E+001<br>−6.474651317E+001 |
| 8 | −0.6837956136<br>−0.7295767638<br>−0.0118871570 | −0.0439565517<br>0.0574488052<br>−0.9973802968 | 0.7283483921<br>−0.6814817536<br>−0.0713529197 | 1.793464400E+001<br>6.604756449E+001<br>−6.418346556E+001 |
| 9 | −0.6565646105<br>−0.7541295542<br>−0.0145439936 | −0.0447960683<br>0.0582342911<br>−0.9972973877 | 0.7529383935<br>−0.6541386572<br>−0.0720166136 | 1.751839659E+001<br>6.622096220E+001<br>−6.308106508E+001 |
| 10 | −0.6565646105<br>−0.7541295542<br>−0.0145439936 | −0.0447960683<br>0.0582342911<br>−0.9972973877 | 0.7529383935<br>−0.6541386572<br>−0.0720166136 | 1.751839659E+001<br>6.622096220E+001<br>−6.308106508E+001 |
| 11 | −0.6565646105<br>−0.7541295542<br>−0.0145439936 | −0.0447960683<br>0.0582342911<br>−0.9972973877 | 0.7529383935<br>−0.6541386572<br>−0.0720166136 | 1.408723977E+001<br>6.920188645E+001<br>−6.275288379E+001 |
| 12 | −0.6565646105<br>−0.7541295542<br>−0.0145439936 | 0.5276897813<br>−0.4454717516<br>−0.7232554274 | 0.5389493547<br>−0.4825386348<br>0.6904274466 | −9.715280989E−001<br>8.228465959E+001<br>−6.131255152E+001 |
| 13 | −0.6565646105<br>−0.7541295542<br>−0.0145439936 | 0.5276897813<br>−0.4454717516<br>−0.7232554274 | 0.5389493547<br>−0.4825386348<br>0.6904274466 | −9.715280989E−001<br>8.228465959E+001<br>−6.131255152E+001 |
| 14 | −0.6565646105<br>−0.7541295542<br>−0.0145439936 | 0.7537162500<br>−0.6566993861<br>0.0256462639 | −0.0288916372<br>0.0058763849<br>0.9995652762 | −9.715280989E−001<br>8.228465959E+001<br>−6.131255152E+001 |
| 15 | 0.9999997042<br>−0.0007607547<br>0.0001132926 | 0.0007607226<br>0.9999996707<br>0.0002827946 | −0.0001135077<br>−0.0002827083<br>0.9999999536 | 4.892056127E−001<br>7.940776125E+001<br>−4.624689337E+001 |
| 16 | 0.9999997042<br>−0.0007607547<br>0.0001132926 | 0.0007607226<br>0.9999996707<br>0.0002827946 | −0.0001135077<br>−0.0002827083<br>0.9999999536 | 4.892056127E−001<br>7.940776125E+001<br>−4.624689337E+001 |
| 17 | 0.9999997042<br>−0.0007607547<br>0.0001132926 | 0.0007607226<br>0.9999996707<br>0.0002827946 | −0.0001135077<br>−0.0002827083<br>0.9999999536 | 4.876678347E−001<br>7.940393118E+001<br>−3.269910661E+001 |
| 18 | 0.9999997042<br>−0.0007607547<br>0.0001132926 | 0.0007607226<br>0.9999996707<br>0.0002827946 | −0.0001135077<br>−0.0002827083<br>0.9999999536 | 4.867597732E−001<br>7.940166951E+001<br>−2.469910698E+001 |
| 19 | 0.9999997042<br>−0.0007607547<br>0.0001132926 | 0.0006688102<br>0.7873244644<br>−0.6165385149 | 0.0003798365<br>0.6165384083<br>0.7873247404 | 4.847166348E−001<br>7.939658076E+001<br>−6.699107813E+000 |
| 20 | 0.9999997042<br>−0.0007607547<br>0.0001132926 | 0.0006688102<br>0.7873244644<br>−0.6165385149 | 0.0003798365<br>0.6165384083<br>0.7873247404 | 4.847166348E−001<br>7.939658076E+001<br>−6.699107813E+000 |
| 21 | 0.9999997042<br>−0.0007607547<br>0.0001132926 | 0.0002921858<br>0.2394858009<br>−0.9708998228 | 0.0007114846<br>0.9708995687<br>0.2394859523 | 4.847166348E−001<br>7.939658076E+001<br>−6.699107813E+000 |
| 22 | 0.9999678527<br>−0.0080158666<br>−0.0001984951 | 0.0001458509<br>0.0429346250<br>−0.9990778732 | 0.0080169972<br>0.9990457266<br>0.0429344139 | −8.707615719E−003<br>5.451519596E+001<br>−1.021632109E+001 |

TABLE 1-continued

ZEMAX Software Output Describing Surface Data Summary and Detail for Each
Individual Element within the Illumination Optical System 98

| | | | | |
|---|---|---|---|---|
| 23 | 0.9999678527 | 0.0001458509 | 0.0080169972 | −8.707615719E−003 |
| | −0.0080158666 | 0.0429346250 | 0.9990457266 | 5.451519596E+001 |
| | −0.0001984951 | −0.9990778732 | 0.0429344139 | −1.021632109E+001 |
| 24 | 0.9999678527 | 0.0001458509 | 0.0080169972 | −5.473424960E−002 |
| | −0.0080158666 | 0.0429346250 | 0.9990457266 | 4.877954327E+001 |
| | −0.0001984951 | −0.9990778732 | 0.0429344139 | −1.046281320E+001 |
| 25 | 0.9999288973 | 0.0007173794 | −0.0119031827 | 7.505312732E−002 |
| | 0.0117436164 | 0.1140931188 | 0.9934006481 | 4.700360971E+001 |
| | 0.0020707164 | −0.9934698011 | 0.1140765819 | −1.091140643E+001 |
| 26 | 0.9999288973 | 0.0007173794 | −0.0119031827 | 7.505312732E−002 |
| | 0.0117436164 | 0.1140931188 | 0.9934006481 | 4.700360971E+001 |
| | 0.0020707164 | −0.9934698011 | 0.1140765819 | −1.091140643E+001 |
| 27 | 0.9999288973 | 0.0007173794 | −0.0119031827 | 1.749705142E−001 |
| | 0.0117436164 | 0.1140931188 | 0.9934006481 | 3.866483183E+001 |
| | 0.0020707164 | −0.9934698011 | 0.1140765819 | −1.186898511E+001 |
| 28 | 1.0000000000 | 0.0000000000 | 0.0000000000 | 0.000000000E+000 |
| | 0.0000000000 | 0.1736481777 | 0.9848077530 | 3.726390811E+001 |
| | 0.0000000000 | −0.9848077530 | 0.1736481777 | −1.283679270E+001 |
| 29 | 1.0000000000 | 0.0000000000 | 0.0000000000 | 0.000000000E+000 |
| | 0.0000000000 | 0.1736481777 | 0.9848077530 | 3.726390811E+001 |
| | 0.0000000000 | −0.9848077530 | 0.1736481777 | −1.283679270E+001 |
| 30 | 1.0000000000 | 0.0000000000 | 0.0000000000 | 0.000000000E+000 |
| | 0.0000000000 | 0.1736481777 | 0.9848077530 | 3.726390811E+001 |
| | 0.0000000000 | −0.9848077530 | 0.1736481777 | −1.283679270E+001 |
| 31 | 1.0000000000 | 0.0000000000 | 0.0000000000 | 0.000000000E+000 |
| | 0.0000000000 | 0.8386705679 | 0.5446390350 | 3.952654387E+001 |
| | 0.0000000000 | −0.5446390350 | 0.8386705679 | −2.566883772E+001 |
| 32 | 1.0000000000 | 0.0000000000 | 0.0000000000 | 0.000000000E+000 |
| | 0.0000000000 | 0.8386705679 | 0.5446390350 | 1.976327193E+001 |
| | 0.0000000000 | −0.5446390350 | 0.8386705679 | −1.283441886E+001 |
| 33 | 1.0000000000 | 0.0000000000 | 0.0000000000 | 0.000000000E+000 |
| | 0.0000000000 | 0.8386705679 | 0.5446390350 | 1.976327193E+001 |
| | 0.0000000000 | −0.5446390350 | 0.8386705679 | −1.283441886E+001 |
| 34 | 1.0000000000 | 0.0000000000 | 0.0000000000 | 0.000000000E+000 |
| | 0.0000000000 | 1.0000000000 | 0.0000000000 | 0.000000000E+000 |
| | 0.0000000000 | 0.0000000000 | 1.0000000000 | 0.000000000E+000 |
| 35 | 1.0000000000 | 0.0000000000 | 0.0000000000 | 0.000000000E+000 |
| | 0.0000000000 | 1.0000000000 | 0.0000000000 | 0.000000000E+000 |
| | 0.0000000000 | 0.0000000000 | 1.0000000000 | 0.000000000E+000 |
| 36 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | 0.000000000E+000 |
| 37 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | 2.500000000E+000 |
| 38 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | 5.500000000E+000 |
| 39 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | 6.000000000E+000 |
| 40 | 1.0000000000 | 0.0000000000 | 0.0000000000 | 0.000000000E+000 |
| | 0.0000000000 | 1.0000000000 | 0.0000000000 | 4.469000000E+003 |
| | 0.0000000000 | 0.0000000000 | 1.0000000000 | 6.000000000E+000 |
| 41 | 1.0000000000 | 0.0000000000 | 0.0000000000 | 0.000000000E+000 |
| | 0.0000000000 | 1.0000000000 | 0.0000000000 | 4.469000000E+003 |
| | 0.0000000000 | 0.0000000000 | 1.0000000000 | 6.000000000E+000 |
| 42 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | 6.000000000E+000 |
| 43 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | 6.000000000E+000 |
| 44 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | 6.000000000E+000 |
| 45 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | 5.500000000E+000 |
| 46 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | 2.500000000E+000 |
| 47 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | 0.000000000E+000 |

TABLE 1-continued

ZEMAX Software Output Describing Surface Data Summary and Detail for Each Individual Element within the Illumination Optical System 98

| | | | | |
|---|---|---|---|---|
| 48 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | −2.300000000E+001 |
| 49 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | −2.500000000E+001 |
| 50 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | −3.077850000E+001 |
| 51 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | −3.097850000E+001 |
| 52 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | −3.717250000E+001 |
| 53 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | −3.737250000E+001 |
| 54 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | −4.466950000E+001 |
| 55 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | −5.285050000E+001 |
| 56 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | −5.376050000E+001 |
| 57 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | −5.376050000E+001 |
| 58 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | −5.376050000E+001 |

ELEMENT VOLUME DATA:

For centered elements with plane or spherical circular faces, exact volumes are computed by assuming edges are squared up to the larger of the front and back radial aperture.
For all other elements, approximate volumes are numerically integrated to 0.1% accuracy. Zero volume means the volume cannot be accurately computed. Single elements that are duplicated in the Lens Data Editor for ray tracing purposes may be listed more than once yielding incorrect total mass estimates.

| | Volume cc | Density g/cc | Mass g |
|---|---|---|---|
| Element surf 3 to 4 | 8.025020 | 2.510000 | 20.142799 |
| Element surf 7 to 8 | 4.769696 | 2.630000 | 12.544300 |
| Element surf 10 to 11 | 3.391090 | 4.230000 | 14.344310 |
| Element surf 16 to 17 | 7.818599 | 3.670000 | 28.694260 |
| Element surf 17 to 18 | 9.784333 | 3.370000 | 32.973202 |
| Element surf 23 to 24 | 3.695705 | 4.230000 | 15.632832 |
| Element surf 26 to 27 | 4.281907 | 4.230000 | 18.112466 |
| Element surf 30 to 31 | 0.000000 | 2.510000 | 0.000000 |
| Element surf 31 to 32 | 0.000000 | 0.000000 | 0.000000 |
| Element surf 32 to 33 | 0.000000 | 0.000000 | 0.000000 |
| Element surf 34 to 35 | 0.000000 | 0.000000 | 0.000000 |
| Element surf 35 to 36 | 0.000000 | 0.000000 | 0.000000 |
| Element surf 37 to 38 | 1.018793 | 2.450000 | 2.496042 |
| Element surf 45 to 46 | 1.074870 | 2.450000 | 2.633431 |
| Element surf 47 to 48 | 22.437579 | 2.510000 | 56.318323 |
| Element surf 49 to 50 | 2.231466 | 3.510000 | 7.832445 |
| Element surf 51 to 52 | 2.387445 | 3.060000 | 7.305583 |
| Element surf 53 to 54 | 1.482802 | 2.460000 | 3.647692 |
| Element surf 54 to 55 | 2.899719 | 3.370000 | 9.772053 |
| Total Mass: | | | 232.449738 |

TABLE 1-continued

ZEMAX Software Output Describing Surface Data Summary and Detail for Each Individual Element within the Illumination Optical System 98

CARDINAL POINTS:

Object space positions are measured with respect to surface 1.
Image space positions are measured with respect to the image surface.
The index in both the object space and image space is considered.

|  | Object Space | Image Space |
|---|---|---|
| W = 0.460000 | | |
| Focal Length: | −8.312566 | 8.312566 |
| Focal Planes: | 3.847888 | −0.619539 |
| Principal Planes: | 12.160454 | −8.932105 |
| Anti-Principal Planes: | −4.464678 | 7.693027 |
| Nodal Planes: | 12.160454 | −8.932105 |
| Anti-Nodal Planes: | −4.464678 | 7.693027 |
| W = 0.525000 (Primary) | | |
| Focal Length: | −8.441475 | 8.441475 |
| Focal Planes: | 3.965614 | −0.715180 |
| Principal Planes: | 12.407089 | −9.156655 |
| Anti-Principal Planes: | −4.475861 | 7.726295 |
| Nodal Planes: | 12.407089 | −9.156655 |
| Anti-Nodal Planes: | −4.475861 | 7.726295 |
| W = 0.638000 | | |
| Focal Length: | −8.588137 | 8.588137 |
| Focal Planes: | 4.163721 | −0.827454 |
| Principal Planes: | 12.751857 | −9.415591 |
| Anti-Principal Planes: | −4.424416 | 7.760682 |
| Nodal Planes: | 12.751857 | −9.415591 |
| Anti-Nodal Planes: | −4.424416 | 7.760682 |

TABLE 2

ZEMAX Software Output Describing Surface Data Summary and Detail for Each Individual Element within the Projection Optical System 99

GENERAL LENS DATA:

Surfaces: 22
Stop: 13
System Aperture: Object Space NA = 0.2
Telecentric Mode: On
Glass Catalogs: MISC SCHOTT OHARA
Ray Aiming: Off
Apodization: Uniform, factor = 5.00000E−001
Effective Focal Length: 53.39083 (in air at system temperature and pressure)
Effective Focal Length: 53.39083 (in image space)
Back Focal Length: −622.2273
Total Track: 330.1757
Image Space F/#: 1.307803e−008
Paraxial Working F/#: 29.07414
Working F/#: 29.00313
Image Space NA: 0.01719487
Object Space NA: 0.2
Stop Radius: 2.913214
Paraxial Image Height: 88.17827
Paraxial Magnification: −11.86947
Entrance Pupil Diameter: 4.082483e+009
Entrance Pupil Position: 1e+010
Exit Pupil Diameter: 21.79671
Exit Pupil Position: −622.2273
Field Type: Object height in Millimeters
Maximum Field: 7.429
Primary Wave: 0.46
Lens Units: Millimeters
Angular Magnification: 1.872981e+008

TABLE 2-continued

ZEMAX Software Output Describing Surface Data Summary and Detail for Each Individual Element within the Projection Optical System 99

Fields: 5
Field Type: Object height in Millimeters

| # | X-Value | Y-Value | Weight |
|---|---------|---------|--------|
| 1 | 0.000000 | 0.000000 | 1.000000 |
| 2 | 0.000000 | 2.500000 | 3.000000 |
| 3 | 0.000000 | 5.000000 | 12.000000 |
| 4 | 0.000000 | 7.000000 | 15.000000 |
| 5 | 0.000000 | 7.429000 | 1.000000 |

Vignetting Factors

| # | VDX | VDY | VCX | VCY | VAN |
|---|-----|-----|-----|-----|-----|
| 1 | 0.000000 | 0.000000 | 0.000000 | 0.000000 | 0.000000 |
| 2 | 0.000000 | 0.000000 | 0.000000 | 0.000000 | 0.000000 |
| 3 | 0.000000 | 0.000000 | 0.000000 | 0.000000 | 0.000000 |
| 4 | 0.000000 | 0.000000 | 0.000000 | 0.000000 | 0.000000 |
| 5 | 0.000000 | 0.000000 | 0.000000 | 0.000000 | 0.000000 |

Wavelengths: 3
Units: μm

| # | Value | Weight |
|---|-------|--------|
| 1 | 0.460000 | 1.000000 |
| 2 | 0.525000 | 1.000000 |
| 3 | 0.635000 | 1.000000 |

SURFACE DATA SUMMARY:

| Surf | Type | Comment | Radius | Thickness | Glass | Diameter | Conic |
|------|------|---------|--------|-----------|-------|----------|-------|
| OBJ | STANDARD | | Infinity | 0 | | 14.858 | 0 |
| 1 | STANDARD | | Infinity | 0.5 | | 16.3438 | 0 |
| 2 | STANDARD | | Infinity | 3 | N-FK5 | 16.56834 | 0 |
| 3 | STANDARD | | Infinity | 2.5 | | 17.46482 | 0 |
| 4 | STANDARD | | Infinity | 23 | N-BK7 | 18.5875 | 0 |
| 5 | STANDARD | | Infinity | 2 | | 25.32628 | 0 |
| 6 | STANDARD | | 49.071 | 5.778508 | S-PHM53 | 27 | 0 |
| 7 | STANDARD | | −49.071 | 0.2 | | 27 | 0 |
| 8 | STANDARD | | 23.88 | 6.19367 | S-BSM81 | 27 | 0 |
| 9 | STANDARD | | Infinity | 0.2 | | 23.87212 | 0 |
| 10 | STANDARD | | 14.732 | 7.297311 | S-FSL5 | 20 | 0 |
| 11 | STANDARD | | −35.2 | 8.181407 | S-TIH6 | 20 | 0 |
| 12 | STANDARD | | 32 | 0.9104899 | | 9 | 0 |
| STO | STANDARD | | Infinity | 6.399912 | | 6.116962 | 0 |
| 14 | STANDARD | | −6.67 | 11.23256 | S-TIH3 | 11 | 0 |
| 15 | STANDARD | | −18 | 0.2 | | 25.6 | 0 |
| 16 | STANDARD | | −96.016 | 4.960048 | S-TIH6 | 30 | 0 |
| 17 | STANDARD | | −52.68 | 49.35403 | | 34 | 0 |
| 18 | STANDARD | | 182.45 | 11.9887 | S-BSM81 | 92 | 0 |
| 19 | STANDARD | | Infinity | 161.2791 | | 92 | 0 |
| 20 | STANDARD | | Infinity | 0 | | 183.3892 | 0 |
| 21 | EVENASPH | | 295.1198 | 25 | POLYCARB | 190.8502 | 0 |
| IMA | STANDARD | | Infinity | | | 174.5479 | 0 |

SURFACE DATA DETAIL:

Surface OBJ: STANDARD
Surface 1: STANDARD
Surface 2: STANDARD
Surface 3: STANDARD
Surface 4: STANDARD
Surface 5: STANDARD
Surface 6: STANDARD
Aperture: Floating Aperture
Maximum Radius: 13.5
Surface 7: STANDARD
Aperture: Floating Aperture
Maximum Radius: 13.5
Surface 8: STANDARD
Aperture: Floating Aperture
Maximum Radius: 13.5
Surface 9: STANDARD TABLE 2-continued ZEMAX Software Output Describing Surface Data Summary and Detail for Each Individual Element within the Projection Optical System 99

Surface 10: STANDARD
Aperture: Floating Aperture
Maximum Radius: 10
Surface 11: STANDARD
Aperture: Floating Aperture
Maximum Radius: 10
Surface 12: STANDARD
Aperture: Floating Aperture
Maximum Radius: 4.5
Surface STO: STANDARD
Surface 14: STANDARD
Aperture: Floating Aperture
Maximum Radius: 5.5
Surface 15: STANDARD
Aperture: Floating Aperture
Maximum Radius: 12.8
Surface 16: STANDARD
Aperture: Floating Aperture
Maximum Radius: 15
Surface 17: STANDARD
Aperture: Floating Aperture
Maximum Radius: 17
Surface 18: STANDARD
Aperture: Floating Aperture
Maximum Radius: 46
Surface 19: STANDARD
Aperture: Floating Aperture
Maximum Radius: 46
Surface 20: STANDARD
Surface 21: EVENASPH
Coeff on r 2: 0
Coeff on r 4: 0
Coeff on r 6: 0
Coeff on r 8: 0
Coeff on r 10: 0
Coeff on r 12: 0
Coeff on r 14: 0
Coeff on r 16: 0
Surface IMA: STANDARD

COATING DEFINITIONS:
PHYSICAL OPTICS PROPAGATION SETTINGS SUMMARY:

OBJ STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
1 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
2 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
3 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

TABLE 2-continued

ZEMAX Software Output Describing Surface Data Summary and Detail for Each Individual Element within the Projection Optical System 99

4 STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

5 STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

6 STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

7 STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

8 STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

9 STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

10 STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

11 STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

12 STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit TABLE 2-continued ZEMAX Software Output Describing Surface Data Summary and Detail for Each Individual Element within the Projection Optical System 99

STO STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

14 STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

15 STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

16 STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

17 STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

18 STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

19 STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

20 STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

21 EVENASPH

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit TABLE 2-continued ZEMAX Software Output Describing Surface Data Summary and Detail for Each
Individual Element within the Projection Optical System 99

IMA STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

EDGE THICKNESS DATA:

| Surf | Edge |
|---|---|
| OBJ | 0.000000 |
| 1 | 0.500000 |
| 2 | 3.000000 |
| 3 | 2.500000 |
| 4 | 23.000000 |
| 5 | 3.893537 |
| 6 | 1.991435 |
| 7 | 6.275709 |
| 8 | 2.011497 |
| 9 | 4.113875 |
| 10 | 1.933102 |
| 11 | 9.949726 |
| 12 | 0.592504 |
| STO | 3.503359 |
| 14 | 8.784551 |
| 15 | 4.365649 |
| 16 | 3.320598 |
| 17 | 58.066448 |
| 18 | 6.094651 |
| 19 | 161.279099 |
| 20 | 15.853350 |
| 21 | 9.146650 |
| IMA | 0.000000 |

MULTI-CONFIGURATION DATA:
Configuration 1:

1 Thickness 20: 0
Configuration 2:

1 Thickness 20: −5
Configuration 3:

1 Thickness 20: 5

SOLVE AND VARIABLE DATA:

Thickness of 6: Variable
Semi Diameter 6: Fixed
Curvature of 7: Solve, pick up value from 6, scaled by −1.00000
Semi Diameter 7: Pickup from 6
Thickness of 8: Variable
Semi Diameter 8: Pickup from 6
Thickness of 10: Variable
Semi Diameter 10: Fixed
Thickness of 11: Variable
Semi Diameter 11: Pickup from 10
Thickness of 12: Variable
Semi Diameter 12: Fixed
Thickness of 13: Variable
Thickness of 14: Variable
Semi Diameter 14: Fixed
Semi Diameter 15: Fixed
Thickness of 16: Variable
Semi Diameter 16: Fixed
Thickness of 17: Variable
Semi Diameter 17: Fixed
Thickness of 18: Variable TABLE 2-continued ZEMAX Software Output Describing Surface Data Summary and Detail for Each
Individual Element within the Projection Optical System 99

Semi Diameter 18: Fixed
Thickness of 19: Variable
Semi Diameter 19: Fixed
Curvature of 21: Variable

INDEX OF REFRACTION DATA:

| Surf | Glass | Temp | Pres | 0.460000 | 0.525000 | 0.635000 |
|---|---|---|---|---|---|---|
| 0 |  | 20.00 | 1.00 | 1.00000000 | 1.00000000 | 1.00000000 |
| 1 |  | 20.00 | 1.00 | 1.00000000 | 1.00000000 | 1.00000000 |
| 2 | N-FK5 | 20.00 | 1.00 | 1.49402111 | 1.49012584 | 1.48594605 |
| 3 |  | 20.00 | 1.00 | 1.00000000 | 1.00000000 | 1.00000000 |
| 4 | N-BK7 | 20.00 | 1.00 | 1.52443350 | 1.51986781 | 1.51501420 |
| 5 |  | 20.00 | 1.00 | 1.00000000 | 1.00000000 | 1.00000000 |
| 6 | S-PHM53 | 25.00 | 1.00 | 1.61177822 | 1.60651481 | 1.60097110 |
| 7 |  | 20.00 | 1.00 | 1.00000000 | 1.00000000 | 1.00000000 |
| 8 | S-BSM81 | 25.00 | 1.00 | 1.65011121 | 1.64405670 | 1.63764082 |
| 9 |  | 20.00 | 1.00 | 1.00000000 | 1.00000000 | 1.00000000 |
| 10 | S-FSL5 | 25.00 | 1.00 | 1.49404408 | 1.49013274 | 1.48594450 |
| 11 | S-TIH6 | 25.00 | 1.00 | 1.83685381 | 1.81725141 | 1.79857441 |
| 12 |  | 20.00 | 1.00 | 1.00000000 | 1.00000000 | 1.00000000 |
| 13 |  | 20.00 | 1.00 | 1.00000000 | 1.00000000 | 1.00000000 |
| 14 | S-TIH3 | 25.00 | 1.00 | 1.76602131 | 1.74996726 | 1.73451038 |
| 15 |  | 20.00 | 1.00 | 1.00000000 | 1.00000000 | 1.00000000 |
| 16 | S-TIH6 | 25.00 | 1.00 | 1.83685381 | 1.81725141 | 1.79857441 |
| 17 |  | 20.00 | 1.00 | 1.00000000 | 1.00000000 | 1.00000000 |
| 18 | S-BSM81 | 25.00 | 1.00 | 1.65011121 | 1.64405670 | 1.63764082 |
| 19 |  | 20.00 | 1.00 | 1.00000000 | 1.00000000 | 1.00000000 |
| 20 |  | 20.00 | 1.00 | 1.00000000 | 1.00000000 | 1.00000000 |
| 21 | POLYCARB | 20.00 | 1.00 | 1.60505860 | 1.59293157 | 1.58138766 |
| 22 |  | 20.00 | 1.00 | 1.00000000 | 1.00000000 | 1.00000000 |

THERMAL COEFFICIENT OF EXPANSION DATA:

| Surf | Glass | TCE * 10E−6 |
|---|---|---|
| 0 |  | 0.00000000 |
| 1 |  | 0.00000000 |
| 2 | N-FK5 | 9.20000000 |
| 3 |  | 0.00000000 |
| 4 | N-BK7 | 7.10000000 |
| 5 |  | 0.00000000 |
| 6 | S-PHM53 | 9.30000000 |
| 7 |  | 0.00000000 |
| 8 | S-BSM81 | 5.80000000 |
| 9 |  | 0.00000000 |
| 10 | S-FSL5 | 9.00000000 |
| 11 | S-TIH6 | 8.90000000 |
| 12 |  | 0.00000000 |
| 13 |  | 0.00000000 |
| 14 | S-TIH3 | 8.50000000 |
| 15 |  | 0.00000000 |
| 16 | S-TIH6 | 8.90000000 |
| 17 |  | 0.00000000 |
| 18 | S-BSM81 | 5.80000000 |
| 19 |  | 0.00000000 |
| 20 |  | 0.00000000 |
| 21 | POLYCARB | 67.00000000 |
| 22 |  | 0.00000000 |

F/# DATA:
F/# calculations consider vignetting factors and ignore surface apertures.

| | Wavelength: | | | | | |
|---|---|---|---|---|---|---|
| | 0.460000 | | 0.525000 | | 0.635000 | |
| # Field | Tan | Sag | Tan | Sag | Tan | Sag |
| 1 0.0000 mm: | 29.0031 | 29.0031 | 28.8420 | 28.8420 | 28.9161 | 28.9161 |
| 2 2.5000 mm: | 29.2056 | 29.0837 | 29.0481 | 28.9190 | 29.0876 | 28.9776 |
| 3 5.0000 mm: | 29.5933 | 29.3230 | 29.5306 | 29.1621 | 29.5295 | 29.1850 |

TABLE 2-continued

ZEMAX Software Output Describing Surface Data Summary and Detail for Each Individual Element within the Projection Optical System 99

| | | | | | | |
|---|---|---|---|---|---|---|
| 4 7.0000 mm: | 29.0724 | 29.5275 | 29.2642 | 29.4061 | 29.3265 | 29.4099 |
| 5 7.4290 mm: | 28.6953 | 29.5394 | 28.9573 | 29.4353 | 29.0457 | 29.4397 |

GLOBAL VERTEX COORDINATES, ORIENTATIONS, AND
ROTATION/OFFSET MATRICES:
Reference Surface: 0

| Surf | R11<br>R21<br>R31 | R12<br>R22<br>R32 | R13<br>R23<br>R33 | X<br>Y<br>Z |
|---|---|---|---|---|
| 0 | 1.0000000000<br>0.0000000000<br>0.0000000000 | 0.0000000000<br>1.0000000000<br>0.0000000000 | 0.0000000000<br>0.0000000000<br>1.0000000000 | 0.000000000E+000<br>0.000000000E+000<br>0.000000000E+000 |
| 1 | 1.0000000000<br>0.0000000000<br>0.0000000000 | 0.0000000000<br>1.0000000000<br>0.0000000000 | 0.0000000000<br>0.0000000000<br>1.0000000000 | 0.000000000E+000<br>0.000000000E+000<br>0.000000000E+000 |
| 2 | 1.0000000000<br>0.0000000000<br>0.0000000000 | 0.0000000000<br>1.0000000000<br>0.0000000000 | 0.0000000000<br>0.0000000000<br>1.0000000000 | 0.000000000E+000<br>0.000000000E+000<br>5.000000000E−001 |
| 3 | 1.0000000000<br>0.0000000000<br>0.0000000000 | 0.0000000000<br>1.0000000000<br>0.0000000000 | 0.0000000000<br>0.0000000000<br>1.0000000000 | 0.000000000E+000<br>0.000000000E+000<br>3.500000000E+000 |
| 4 | 1.0000000000<br>0.0000000000<br>0.0000000000 | 0.0000000000<br>1.0000000000<br>0.0000000000 | 0.0000000000<br>0.0000000000<br>1.0000000000 | 0.000000000E+000<br>0.000000000E+000<br>6.000000000E+000 |
| 5 | 1.0000000000<br>0.0000000000<br>0.0000000000 | 0.0000000000<br>1.0000000000<br>0.0000000000 | 0.0000000000<br>0.0000000000<br>1.0000000000 | 0.000000000E+000<br>0.000000000E+000<br>2.900000000E+001 |
| 6 | 1.0000000000<br>0.0000000000<br>0.0000000000 | 0.0000000000<br>1.0000000000<br>0.0000000000 | 0.0000000000<br>0.0000000000<br>1.0000000000 | 0.000000000E+000<br>0.000000000E+000<br>3.100000000E+001 |
| 7 | 1.0000000000<br>0.0000000000<br>0.0000000000 | 0.0000000000<br>1.0000000000<br>0.0000000000 | 0.0000000000<br>0.0000000000<br>1.0000000000 | 0.000000000E+000<br>0.000000000E+000<br>3.677850848E+001 |
| 8 | 1.0000000000<br>0.0000000000<br>0.0000000000 | 0.0000000000<br>1.0000000000<br>0.0000000000 | 0.0000000000<br>0.0000000000<br>1.0000000000 | 0.000000000E+000<br>0.000000000E+000<br>3.697850848E+001 |
| 9 | 1.0000000000<br>0.0000000000<br>0.0000000000 | 0.0000000000<br>1.0000000000<br>0.0000000000 | 0.0000000000<br>0.0000000000<br>1.0000000000 | 0.000000000E+000<br>0.000000000E+000<br>4.317217864E+001 |
| 10 | 1.0000000000<br>0.0000000000<br>0.0000000000 | 0.0000000000<br>1.0000000000<br>0.0000000000 | 0.0000000000<br>0.0000000000<br>1.0000000000 | 0.000000000E+000<br>0.000000000E+000<br>4.337217864E+001 |
| 11 | 1.0000000000<br>0.0000000000<br>0.0000000000 | 0.0000000000<br>1.0000000000<br>0.0000000000 | 0.0000000000<br>0.0000000000<br>1.0000000000 | 0.000000000E+000<br>0.000000000E+000<br>5.066948953E+001 |
| 12 | 1.0000000000<br>0.0000000000<br>0.0000000000 | 0.0000000000<br>1.0000000000<br>0.0000000000 | 0.0000000000<br>0.0000000000<br>1.0000000000 | 0.000000000E+000<br>0.000000000E+000<br>5.885089610E+001 |
| 13 | 1.0000000000<br>0.0000000000<br>0.0000000000 | 0.0000000000<br>1.0000000000<br>0.0000000000 | 0.0000000000<br>0.0000000000<br>1.0000000000 | 0.000000000E+000<br>0.000000000E+000<br>5.976138604E+001 |
| 14 | 1.0000000000<br>0.0000000000<br>0.0000000000 | 0.0000000000<br>1.0000000000<br>0.0000000000 | 0.0000000000<br>0.0000000000<br>1.0000000000 | 0.000000000E+000<br>0.000000000E+000<br>6.616129816E+001 |
| 15 | 1.0000000000<br>0.0000000000<br>0.0000000000 | 0.0000000000<br>1.0000000000<br>0.0000000000 | 0.0000000000<br>0.0000000000<br>1.0000000000 | 0.000000000E+000<br>0.000000000E+000<br>7.739386198E+001 |
| 16 | 1.0000000000<br>0.0000000000<br>0.0000000000 | 0.0000000000<br>1.0000000000<br>0.0000000000 | 0.0000000000<br>0.0000000000<br>1.0000000000 | 0.000000000E+000<br>0.000000000E+000<br>7.759386198E+001 |
| 17 | 1.0000000000<br>0.0000000000<br>0.0000000000 | 0.0000000000<br>1.0000000000<br>0.0000000000 | 0.0000000000<br>0.0000000000<br>1.0000000000 | 0.000000000E+000<br>0.000000000E+000<br>8.255391027E+001 |
| 18 | 1.0000000000<br>0.0000000000<br>0.0000000000 | 0.0000000000<br>1.0000000000<br>0.0000000000 | 0.0000000000<br>0.0000000000<br>1.0000000000 | 0.000000000E+000<br>0.000000000E+000<br>1.319079376E+002 |
| 19 | 1.0000000000<br>0.0000000000<br>0.0000000000 | 0.0000000000<br>1.0000000000<br>0.0000000000 | 0.0000000000<br>0.0000000000<br>1.0000000000 | 0.000000000E+000<br>0.000000000E+000<br>1.438966413E+002 |
| 20 | 1.0000000000<br>0.0000000000<br>0.0000000000 | 0.0000000000<br>1.0000000000<br>0.0000000000 | 0.0000000000<br>0.0000000000<br>1.0000000000 | 0.000000000E+000<br>0.000000000E+000<br>3.051757408E+002 |

TABLE 2-continued

ZEMAX Software Output Describing Surface Data Summary and Detail for Each Individual Element within the Projection Optical System 99

| 21 | 1.0000000000 | 0.0000000000 | 0.0000000000 | 0.000000000E+000 |
|---|---|---|---|---|
|  | 0.0000000000 | 1.0000000000 | 0.0000000000 | 0.000000000E+000 |
|  | 0.0000000000 | 0.0000000000 | 1.0000000000 | 3.051757408E+002 |
| 22 | 1.0000000000 | 0.0000000000 | 0.0000000000 | 0.000000000E+000 |
|  | 0.0000000000 | 1.0000000000 | 0.0000000000 | 0.000000000E+000 |
|  | 0.0000000000 | 0.0000000000 | 1.0000000000 | 3.301757408E+002 |

ELEMENT VOLUME DATA:

For centered elements with plane or spherical circular faces, exact volumes are computed by assuming edges are squared up to the larger of the front and back radial aperture.
For all other elements, approximate volumes are numerically integrated to 0.1% accuracy. Zero volume means the volume cannot be accurately computed.
Single elements that are duplicated in the Lens Data Editor for ray tracing purposes may be listed more than once yielding incorrect total mass estimates.

|  | Volume cc | Density g/cc | Mass g |
|---|---|---|---|
| Element surf 2 to 3 | 0.718686 | 2.450000 | 1.760781 |
| Element surf 4 to 5 | 11.586722 | 2.510000 | 29.082673 |
| Element surf 6 to 7 | 2.231471 | 3.510000 | 7.832462 |
| Element surf 8 to 9 | 2.387256 | 3.060000 | 7.305005 |
| Element surf 10 to 11 | 1.482899 | 2.460000 | 3.647932 |
| Element surf 11 to 12 | 2.886252 | 3.370000 | 9.726669 |
| Element surf 14 to 15 | 5.826621 | 3.110000 | 18.120791 |
| Element surf 16 to 17 | 3.888465 | 3.370000 | 13.104127 |
| Element surf 18 to 19 | 60.212756 | 3.060000 | 184.251035 |
| Element surf 21 to 22 | 449.470461 | 1.250000 | 561.838077 |
| Total Mass: |  |  | 836.669550 |

CARDINAL POINTS:
Object space positions are measured with respect to surface 1.
Image space positions are measured with respect to the image surface.
The index in both the object space and image space is considered.

|  | Object Space | Image Space |
|---|---|---|
| W = 0.460000 (Primary) |  |  |
| Focal Length: | −53.390829 | 53.390829 |
| Focal Planes: | 4.498166 | −622.227272 |
| Principal Planes: | 57.888995 | −675.618101 |
| Anti-Principal Planes: | −48.892663 | −568.836444 |
| Nodal Planes: | 57.888995 | −675.618101 |
| Anti-Nodal Planes: | −48.892663 | −568.836444 |
| W = 0.525000 |  |  |
| Focal Length: | −51.915834 | 51.915834 |
| Focal Planes: | 4.391026 | −604.898243 |
| Principal Planes: | 56.306860 | −656.814077 |
| Anti-Principal Planes: | −47.524807 | −552.982409 |
| Nodal Planes: | 56.306860 | −656.814077 |
| Anti-Nodal Planes: | −47.524807 | −552.982409 |
| W = 0.635000 |  |  |
| Focal Length: | −50.637947 | 50.637947 |
| Focal Planes: | 4.268027 | −589.053890 |
| Principal Planes: | 54.905974 | −639.691837 |
| Anti-Principal Planes: | −46.369920 | −538.415942 |
| Nodal Planes: | 54.905974 | −639.691837 |
| Anti-Nodal Planes: | −46.369920 | −538.415942 |

The illumination optical system 98 as described above properly images the output surface of the optical concentrator element 16 directly on the digital imaging device 75.

Instead of comprising lenses, the elements within the illumination and projection optical systems each may alternatively comprise a refractive element, a reflective element (e.g. mirror), a diffractive element, or combinations thereof. The surface shapes may be provided in whole, or in part, by Fresnel steps or facets. It may be desirable to provide additional mirror elements to effect additional folds in the optical path of the optical system to thereby reduce the overall dimensions of the housing containing the DLP system 100.

The DLP system 100 described above preferably has the following characteristics: high resolution (e.g. XGA or greater); low power requirement of less than 30 watts; light weight (less than 30 pounds); small form factor; inputs such as, for example, DVI, VGA, USB, RS232, composite, and HDMI may be employed.

The DLP system 100 of the present invention may be employed as a free-standing or hand-held projector (i.e. without a screen), or alternatively may be employed in conjunction with a screen such as, for example, the types disclosed in U.S. Pat. No. 6,301,417 issued to Biscardi et al or U.S. Pat. No. 6,487,350 issued to Veligdan et al. These screens (or optical display panels) are known to have superior brightness and contrast even in ambient conditions.

The contemplated modifications and variations specifically mentioned above are considered to be within the spirit and scope of the present invention.

Those of ordinary skill in the art will recognize that various modifications and variations may be made to the embodiments described above without departing from the spirit and scope of the present invention. For example, other colored LEDs may be employed for the LED arrays 150 instead of the red, green, or blue LEDs mentioned in the above embodiment. It is therefore to be understood that the present invention is not limited to the particular embodiments disclosed above, but it is intended to cover such modifications and variations as defined by the following claims.

What is claimed is:

1. An optical system for a digital light projection system, the optical system comprising:
    at least one LED array, wherein each LED array comprises a plurality of LEDs; and
    an optical concentrator element positioned substantially adjacent to each LED array, wherein the concentrator element has a complex conic shape along a direction longitudinally from an input surface of the concentrator element to an output surface of the concentrator element, wherein the complex conic shape of the concentrator element includes at least one side which comprises a first side surface portion and a second side surface portion, wherein the first side surface portion is defined by a first equation and the second side surface portion is defined by a second equation which differs from the first equation, wherein the first side surface portion and the second side surface portion are positioned along the direction longitudinally from the input surface of the concentrator element to the output surface of the concentrator element, wherein each concentrator element totally internally reflects light emitted from the plurality of LEDs within the corresponding LED array so as to provide substantially uniform light at the output surface of each concentrator element, and wherein the light totally internally, reflected by the concentrator element includes light totally internally reflected via both the first side surface portion and the second side surface portion.

2. The optical system of claim 1, wherein the concentrator element is positioned directly in contact with each LED array.

3. The optical system of claim 1 further comprising an optical coupling material positioned between the concentrator element and each LED array, wherein the optical coupling material is in contact with the concentrator element and each LED array.

4. The optical system of claim 3, wherein the optical coupling material comprises a gel having an index of refraction which substantially matches that of the concentrator element.

5. The optical system of claim 1, wherein each LED array comprises LEDs which are less than 0.35 mm in width.

6. The optical system of claim 1, wherein each LED array comprises LEDs which are spaced from adjacent LEDs within the same array by an amount less than 0.025 mm.

7. The optical system of claim 1, wherein the concentrator element has a substantially parabolic cross section.

8. The optical system of claim 1, wherein the optical system is an illumination optical system.

9. The optical system of claim 1 further comprising a digital imaging device.

10. The optical system of claim 9, wherein the output surface of each concentrator element is imaged directly on the digital imaging device.

11. An optical system for a digital light projection system, the optical system comprising:
    a plurality of LED arrays, wherein each LED array comprises a plurality of LEDs;
    an optical concentrator element positioned substantially adjacent to each of the LED arrays, wherein the concentrator element has a complex conic shape along a direction longitudinally from an input surface of the concentrator element to an output surface of the concentrator element, wherein the complex conic shape of the concentrator element includes at least one side which comprises a first side surface portion and a second side surface portion, wherein the first side surface portion is defined by a first equation and the second side surface portion is defined by a second equation which differs from the first equation, wherein the first side surface portion and the second side surface portion are positioned along the direction longitudinally from the input surface of the concentrator element to the output surface of the concentrator element, wherein each concentrator element totally internally reflects light emitted from the plurality of LEDs within the corresponding LED array so as to provide substantially uniform light at the output surface of each concentrator element, and wherein the light totally internally reflected by the concentrator element includes light totally internally reflected via both the first side surface portion and the second side surface portion; and
    an optical combiner element, wherein the output surface of each concentrator element is positioned substantially adjacent to a corresponding side of the combiner element, and wherein the combiner element spatially combines the substantially uniform light provided at the output surface of each concentrator element so as to form substantially white light at an output surface of the combiner element.

12. The optical system of claim 11, wherein the concentrator element is positioned directly in contact with each LED array.

13. The optical system of claim 11 further comprising an optical coupling material positioned between the concentrator element and each LED array, wherein the optical coupling material is in contact with the concentrator element and each LED array.

14. The optical system of claim 13, wherein the optical coupling material comprises a gel having an index of refraction which substantially matches that of the concentrator element.

15. The optical system of claim 11, wherein each LED array comprises LEDs which are less than 0.35 mm in width.

16. The optical system of claim 11, wherein each LED array comprises LEDs which are spaced from adjacent LEDs within the same array by an amount less than 0.025 mm.

17. The optical system of claim 11, wherein the concentrator element has a substantially parabolic cross section.

18. The optical system of claim 11, wherein the plurality of LED arrays consists of 3 LED arrays, wherein the 3 LED arrays consist of 3 single-color LED arrays, and wherein each of the 3 single-color LED arrays is of a different color from one another.

19. The optical system of claim 18, wherein the 3 single-color LED arrays consist of an LED array consisting of only red LEDs, an LED array consisting of only green LEDs, and an LED array consisting of only blue LEDs.

20. The optical system of claim 11, wherein the plurality of LED arrays consists of 3 LED arrays, and wherein the combiner element is a combiner cube.

21. The optical system of claim 11, wherein the plurality of LED arrays consists of 3 LED arrays, wherein the combiner element is a dichroic combiner cube.

22. The optical system of claim 11, wherein the plurality of LED arrays consists of 3 LED arrays, wherein the combiner element is a dichroic combiner cube, and wherein the combiner cube comprises 4 prisms.

23. The optical system of claim 11, wherein the optical system is an illumination optical system.

24. The optical system of claim 11 further comprising a digital imaging device.

25. The optical system of claim 24, wherein the output surface of each concentrator element is imaged directly on the digital imaging device.

26. The optical system of claim 1, wherein the first side surface portion and the second side surface portion are curved.

27. The optical system of claim 11, wherein the first side surface portion and the second side surface portion are curved.

* * * * *